US012808529B2

(12) United States Patent
Kang

(10) Patent No.: US 12,808,529 B2
(45) Date of Patent: Nov. 24, 2026

(54) STREETLIGHTS WITH IMPROVED THERMAL EFFICIENCY AND EXTENDED LIFESPAN

(71) Applicant: TOP SYSTEM CO., LTD., Gyeonggi-do (KR)

(72) Inventor: Taewook Kang, Gyeonggi-do (KR)

(73) Assignees: TOP SYSTEM CO., LTD., Gyeonggi-do (KR); Taewook Kang, Gyeonggi-do (KR)

(*) Notice: Subject to any disclaimer, the term of this patent is extended or adjusted under 35 U.S.C. 154(b) by 0 days.

(21) Appl. No.: 19/430,464

(22) Filed: Dec. 23, 2025

(65) Prior Publication Data

US 2026/0276189 A1 Sep. 17, 2026

(30) Foreign Application Priority Data

Jan. 22, 2025 (KR) ........................ 10-2025-0009266

(51) Int. Cl.

| | |
|---|---|
| ***F21V 29/83*** | (2015.01) |
| ***F21S 8/08*** | (2006.01) |
| ***F21V 17/08*** | (2006.01) |
| ***F21V 29/503*** | (2015.01) |
| ***F21V 29/71*** | (2015.01) |
| *F21W 131/103* | (2006.01) |
| *F21Y 115/10* | (2016.01) |

(52) U.S. Cl.

CPC .............. *F21V 29/83* (2015.01); *F21S 8/086* (2013.01); *F21V 17/08* (2013.01); *F21V 29/503* (2015.01); *F21V 29/713* (2015.01); *F21W 2131/103* (2013.01); *F21Y 2115/10* (2016.08)

(58) Field of Classification Search

CPC ........ F21V 29/503; F21V 29/70; F21V 29/71; F21V 29/713; F21V 29/83; F21S 8/085; F21S 8/086; F21W 2131/103

See application file for complete search history.

(56) References Cited

U.S. PATENT DOCUMENTS 7,798,684 B2 * 9/2010 Boissevain ............. F21V 29/83 362/345

FOREIGN PATENT DOCUMENTS

| | | | |
|---|---|---|---|
| KR | 100898062 B1 * | 5/2009 | ............. F21S 13/10 |
| KR | 1020090100784 | 9/2009 | |
| KR | 101245260 | 3/2013 | |

* cited by examiner

*Primary Examiner* — Robert J May

(74) *Attorney, Agent, or Firm* — IPLA P.A.

(57) ABSTRACT

A streetlight with improved thermal efficiency and extended lifespan, includes: a pole in which an inflow port; a support tube in which an air transfer passage is formed; and a lighting portion coupled to one side of the support tube and configured to emit light downward to illuminate a predetermined illumination area, wherein the lighting portion includes: a case in which a heat dissipation space is formed; a lighting unit installed on one side of a lower surface of the case; and a heat sink in which a flow path for air flow is formed.

7 Claims, 25 Drawing Sheets

STREETLIGHTS WITH IMPROVED THERMAL EFFICIENCY AND EXTENDED LIFESPAN

BACKGROUND

The present invention relates to a streetlight with improved thermal efficiency and extended lifespan, and more particularly, to a streetlight in which external air introduced into a lighting unit is divided and supplied respectively to the inner and outer spaces of a heat sink by utilizing a natural convection airflow, thereby significantly enhancing the heat-dissipation performance of the lighting unit throughout all seasons.

Streetlights are lighting facilities that are installed in various environments such as sidewalks and parks where people walk, roads where vehicles travel, rural areas, agricultural cultivation greenhouses, coastal regions including small and large ports in fishing villages, mountainous terrains, and military surveillance areas and are used to secure nighttime visibility and ensure safety in diverse external environments by illuminating a predetermined lighting area.

Conventional streetlights generally has been used high-pressure mercury lamps, fluorescent lamps, or sodium lamps. However, these lamps have short operational lifespans, poor impact resistance, and high power consumption. Accordingly, high-intensity light-emitting diodes (LEDs), which are environmentally friendly, excellent in impact resistance, and low in power consumption, have recently been mainly used.

As is well known, the LEDs inevitably generate a considerable amount of heat in the process of converting electricity into light. In particular, in streetlights where high illuminance is required, high-power, high-brightness LEDs are used, and the amount of electricity used increases, and accordingly, the amount of heat generated also greatly increases.

Such high-temperature heat generation causes thermal stress in the streetlights and thermally degrades the components of the streetlight due to heat accumulation, thereby causing problems such as deterioration of the LED function leading to reduced illuminance, or a significant decrease in the lifespan of the LED.

Accordingly, various technologies for improving the heat dissipation performance of streetlights have been studied. For example, Korean Patent Registration No. 10-1245260 discloses a streetlight in which a ventilator is provided inside the pole and is driven to forcibly draw in external air and deliver the air toward the light source portion in order to improve the heat dissipation performance. However, this causes the structure of the streetlight to become highly complicated due to the installation structure and installation space that are inevitably required for the ventilator, as well as the power-supply structure for the ventilator, which must be provided for heat dissipation. In addition, because the ventilator must be operated frequently, power consumption increases, resulting not only in a significant rise in total power consumption but also in safety issues and maintenance/management problems.

Korean Patent Publication No. 10-2009-0100784 proposes a streetlight employing a heat-dissipation method that induces the flow of air to address the above problems, and one example thereof is illustrated in FIG. 1.

FIG. 1 is a view illustrating a conventional streetlight having an air flow induced heat dissipation structure.

As shown in FIG. 1, a conventional streetlight (100) having an air flow induced heat dissipation structure includes a streetlight body (110) installed at an upper portion of a pole, an LED (120) installed inside the streetlight body (110) and emitting light downward, a heat sink (130) installed inside the streetlight body (110) above the LED (120) and having a plurality of heat dissipation fins (not shown), and a cover (140) installed on one side of the streetlight body (110) above the heat sink (130) and having a vent hole (141) formed on one side through which external air is introduced.

The conventional streetlight (100) having such an air flow induced heat dissipation structure induces the inflow of external air through the vent hole (141) of the cover (140), and cools the heat sink (130) by means of the introduced external air, thereby increasing the heat dissipation efficiency of the LED (120).

However, in the conventional streetlight (100) having the air flow induced heat dissipation structure, the external air introduced from outside merely passes through the space of the cover (140) formed at the upper portion of the streetlight body (110) to cool the heat dissipation fins (131). Thus, because the cooling section for the heat dissipation fins (131) is too short, sufficient cooling time with the outside air cannot be obtained to dissipate the large amount of heat actually generated in the LED (120), and therefore there has been a limitation in effectively dissipating heat from the LED (120).

Patent Literatures

Patent Literature 1: Koran Patent Registration No. 10-1245260 (LED streetlight using solar and wind force equipped with heat radiating structure)

Patent Literature 2: Korean Patent Publication No. 10-2009-0100784 (Streetlight with LED radiating structure)

SUMMARY OF THE INVENTION

The present disclosure has been made in an effort to solve the problems described above, and an object of the present disclosure is to provide a streetlight with improved thermal efficiency and extended lifespan, in which air inside a lighting unit is discharged to the outside by convection, thereby allowing external air to be introduced into the lighting unit, and a portion of the introduced external air is branched and supplied to the inner and outer sides of the heat sink of the lighting unit, so that the heat inside the heat sink and heat sources around the outside of the heat sink are removed or discharged to the outside, thereby improving the cooling efficiency of the heat sink and greatly enhancing the heat dissipation efficiency of the lighting unit.

Another object of the present invention is to provide a streetlight with improved thermal efficiency and extended lifespan, in which an extension portion having a nut member integrally coupled thereto is formed at the upper portion of the pole, and the support tube is coupled thereto such that one end of a fastening member passes through the support tube and is coupled to the nut member, thereby enabling the pole and the support tube to be coupled with a simple structure while maintaining a stable and firm coupling state.

Further another object of the present invention is to provide a streetlight with improved thermal efficiency and extended lifespan, which include first and second shielding portions that respectively shield the front of a first air discharge port through which air that has passed through the heat sink is discharged, and a second air discharge port through which air that has passed through an upper space of the case is discharged, thereby allowing smooth airflow and further improving the heat dissipation efficiency.

Further another object of the present invention is to provide a streetlight with improved thermal efficiency and extended lifespan, in which the inflow amount of external air introduced into the interior of the pole is adjusted, or the inflow of external air is blocked according to the outside air temperature, thereby not only greatly enhancing the heat dissipation efficiency of the lighting unit, but also preventing lighting units such as LEDs from being damaged by cold external air.

According to an aspect of the invention to achieve the object described above, there is provided a streetlight with improved thermal efficiency and extended lifespan, including a pole in which an inflow port, through which external air is introduced, is formed at a lower portion thereof, and a hollow portion, through which the introduced air moves upward, is formed inside the pole; a support tube in which an air transfer passage is formed, one end of the support tube being coupled to an upper portion of the pole such that the air transfer passage communicates with the hollow portion, the support tube being formed to extend outward from the pole, and a plurality of through holes communicating with the air transfer passage being formed on one side thereof; and a lighting portion coupled to one side of the support tube and configured to emit light downward to illuminate a predetermined illumination area, wherein the lighting portion includes a case in which a heat dissipation space is formed, one side of a rear end of the case being coupled to one side of the support tube such that at least one of the plurality of through holes communicates with the heat dissipation space, a first air discharge port being formed at one side of a front end of the case, and a second air discharge port being formed at one side of an upper portion of the case; a lighting unit installed on one side of a lower surface of the case; and a heat sink in which a flow path for air flow is formed, the heat sink being installed above the lighting unit inside the case, one end of the heat sink being connected to the other side of the support tube such that at least one of the plurality of through holes communicates with the flow path, and the other end of the heat sink being connected to an inner surface of the front end of the case such that the first air discharge port communicates with the flow path.

In addition, the support tube includes a first through hole formed on one side of an upper surface thereof connected to the case, the first through hole communicating with the heat dissipation space, and a second through hole formed on one side of a lateral surface thereof, the second through hole communicating with the heat dissipation space in a direction different from the first through hole.

In addition, the pole includes a body portion having the inflow port, through which the external air is introduced, formed at a lower portion thereof and the hollow portion, through which the introduced air moves upward, formed therein; and an extension portion that extends upward from an upper end of the body portion, at least one side of the extension portion being bent to have a diameter smaller than that of the body portion, and a nut member being integrally formed on one side of the extension portion, the nut member having a nut hole being formed in a lateral surface thereof; wherein the support tube includes a coupling portion inserted into the extension portion, the coupling portion having, at one side corresponding to the nut member, a coupling hole through which a fastening means passes to be screw-coupled to the nut member, whereby the coupling portion is fastened to the extension portion.

In addition, the lighting potion further includes a first shielding portion extending from one side of a front end of the case and spaced apart from a front side of the first air discharge port by a predetermined distance so as to shield the front side of the first air discharge port, thereby allowing the air discharged through the first air discharge port to be discharged upward or downward; and a second shielding portion extending from an upper side of the case and spaced apart from a front side of the second air discharge port by a predetermined distance so as to shield the front side of the second air discharge port, thereby allowing the air discharged through the second air discharge port to be discharged upward or downward.

In addition, the pole includes a body portion having the inflow port, through which the external air is introduced, formed at a lower portion thereof and the hollow portion, through which the introduced air moves upward, formed therein; and a cover installed on one side of the body portion where the inflow port is formed, the cover shielding the inflow port and having, at a lower portion thereof, a plurality of air inlets through which the external air is introduced, wherein each of the air inlets are formed with a predetermined diameter so as to prevent foreign substances from entering from the outside.

In addition, the cover includes a first body portion installed on one side of the body portion where the inflow port is formed, the first body portion having an opening formed at a lower side thereof; and a second body portion formed to surround the first body portion and configured to shield the opening, the second body portion having a lower end rotatably coupled to a lower portion of the first body portion, rotating toward an outward direction of the pole when an external temperature is equal to or lower than a predetermined reference temperature, and having, at an upper side thereof, an air inlet through which the external air is introduced.

In addition, the pole further includes an opening/closing portion installed on one side of the body portion where the air inlet is formed, the opening/closing portion being configured to open or close the air inlet.

BRIEF DESCRIPTION OF THE DRAWINGS

The above and other objects, features and advantages of the present invention will be more apparent from the following detailed description taken in confluence with the accompanying drawings, in which.

| Reference Signs List | |
|---|---|
| 1: Streetlight | 10: Pole |
| 11: Body portion | 11a: Inflow port |
| 11b: Hollow portion | 12: Cover |
| 12a: Air inlet | 12': Cover |
| 12'a: First body portion | 12'aa: Opening |
| 12'b: Second body portion | 13: Extension portion |
| 13a: Recessed portion | 13b: Nut member |
| 13ba: Nut hole | 20: Support tube |
| 21: Coupling portion | 21a: Coupling hole |
| 22: Air transfer pipe | 22a: Airflow passage |
| 22b: First through hole | 22c: Second through hole |
| 22d: Third through hole | 30: Lighting portion |
| 31: Case | 31a: Heat dissipation space |
| 31b: First air discharge port | 31c: Second air discharge port |
| 32: Lighting unit (LED) | 33: Heat sink |
| 33a: Flow path | 34: First shielding portion |
| 35: Second shielding portion | 35a: Discharge hole |
| 40: Opening/Closing portion | 41: Ring body |
| 42: Fixed panel | 42a: First pass-through hole |
| 43: Rotating panel | 43a: Second pass-through hole |

DETAILED DESCRIPTION OF THE PREFERRED EMBODIMENT

Hereinafter, a preferred embodiment of the present invention will be described in detail with reference to the accompanying drawings.

Figure 1:
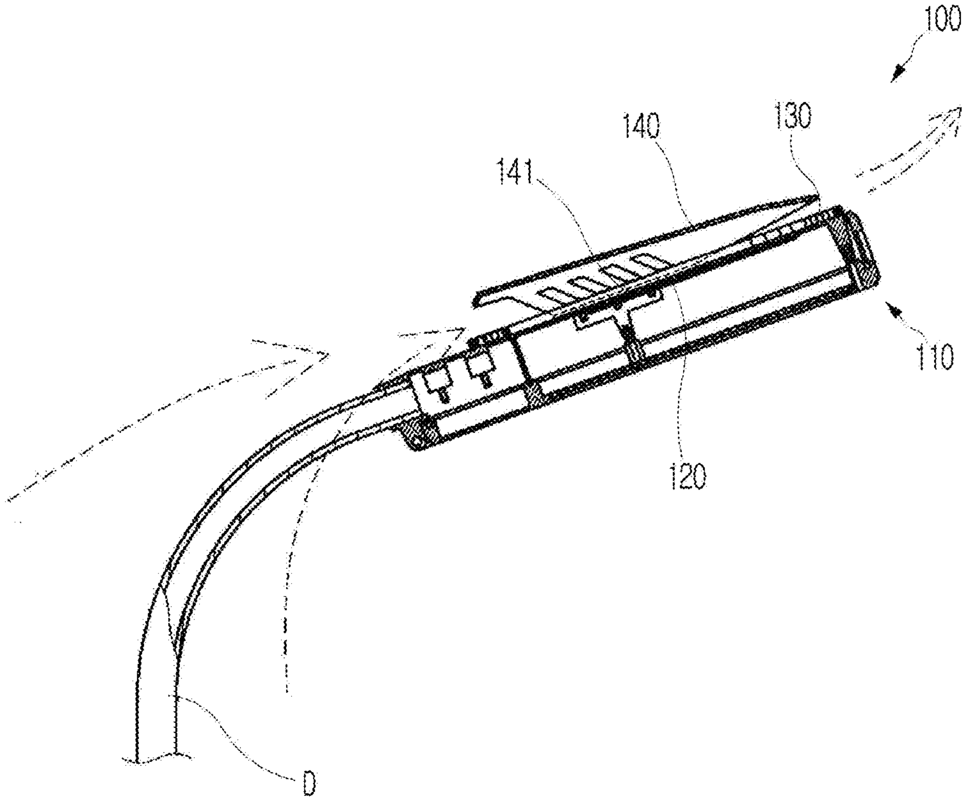
FIG. 1 Prior Art
FIG. 1 is a view illustrating a conventional streetlight having an air flow induced heat dissipation structure.
Figure 2:
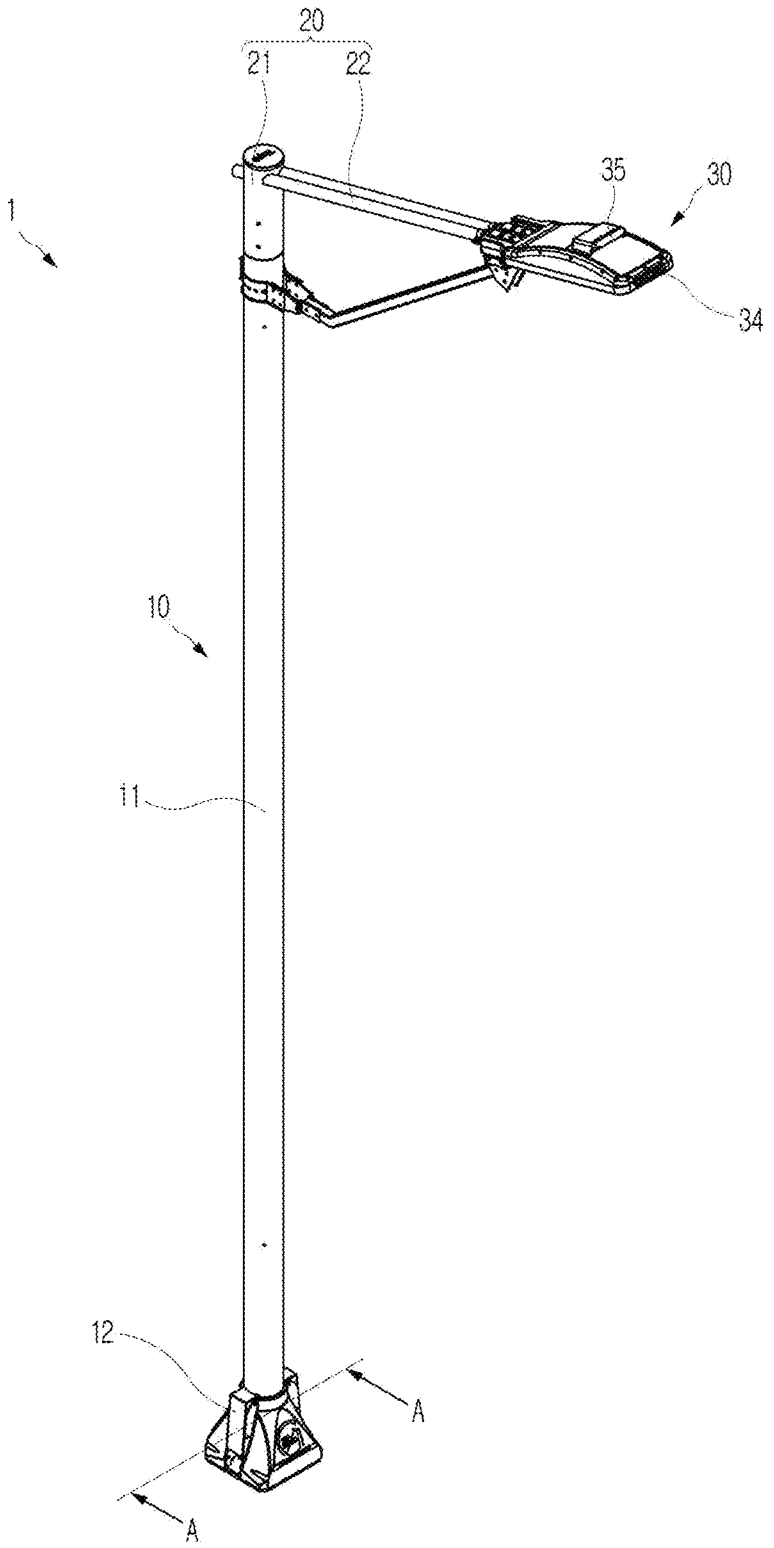
FIG. 2 is a perspective view illustrating a streetlight with improved thermal efficiency and extended lifespan according to an embodiment of the present invention.
Figure 3:
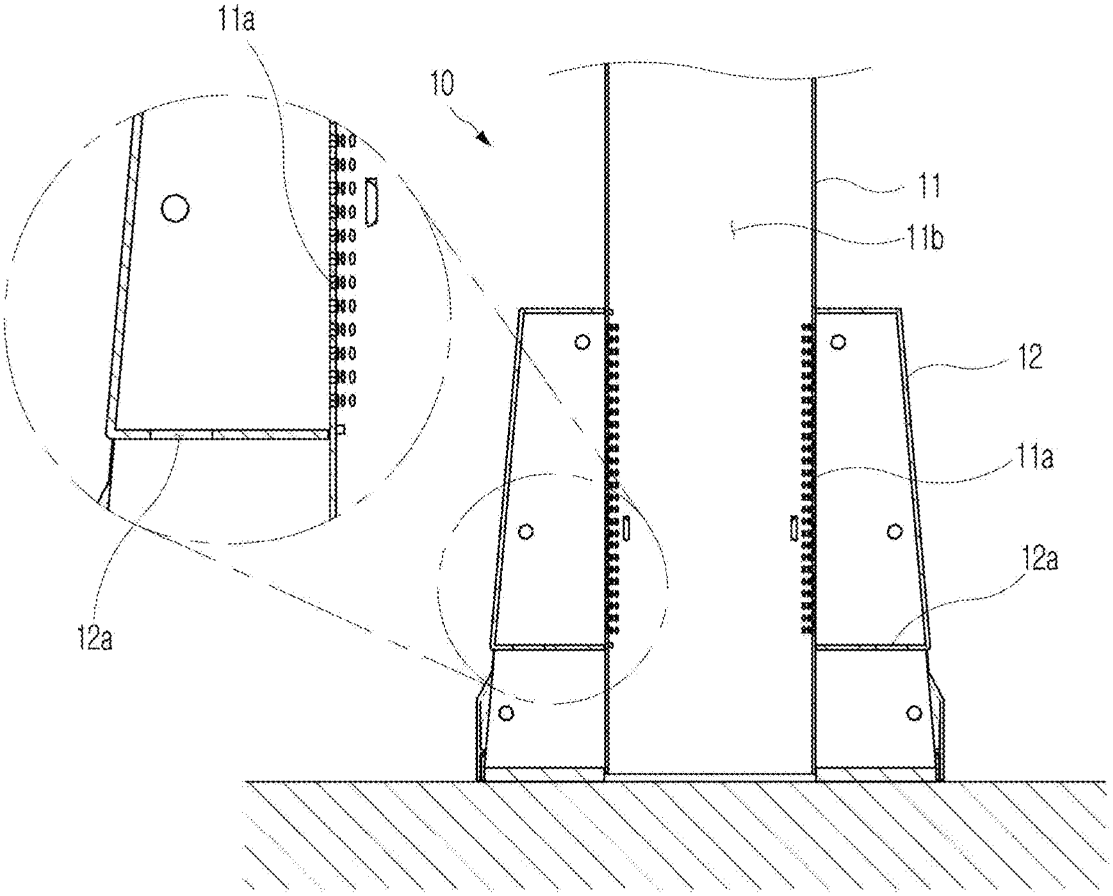
FIG. 3 is a drawing showing a lower portion of a pole according to an embodiment of the present invention.
Figure 4:
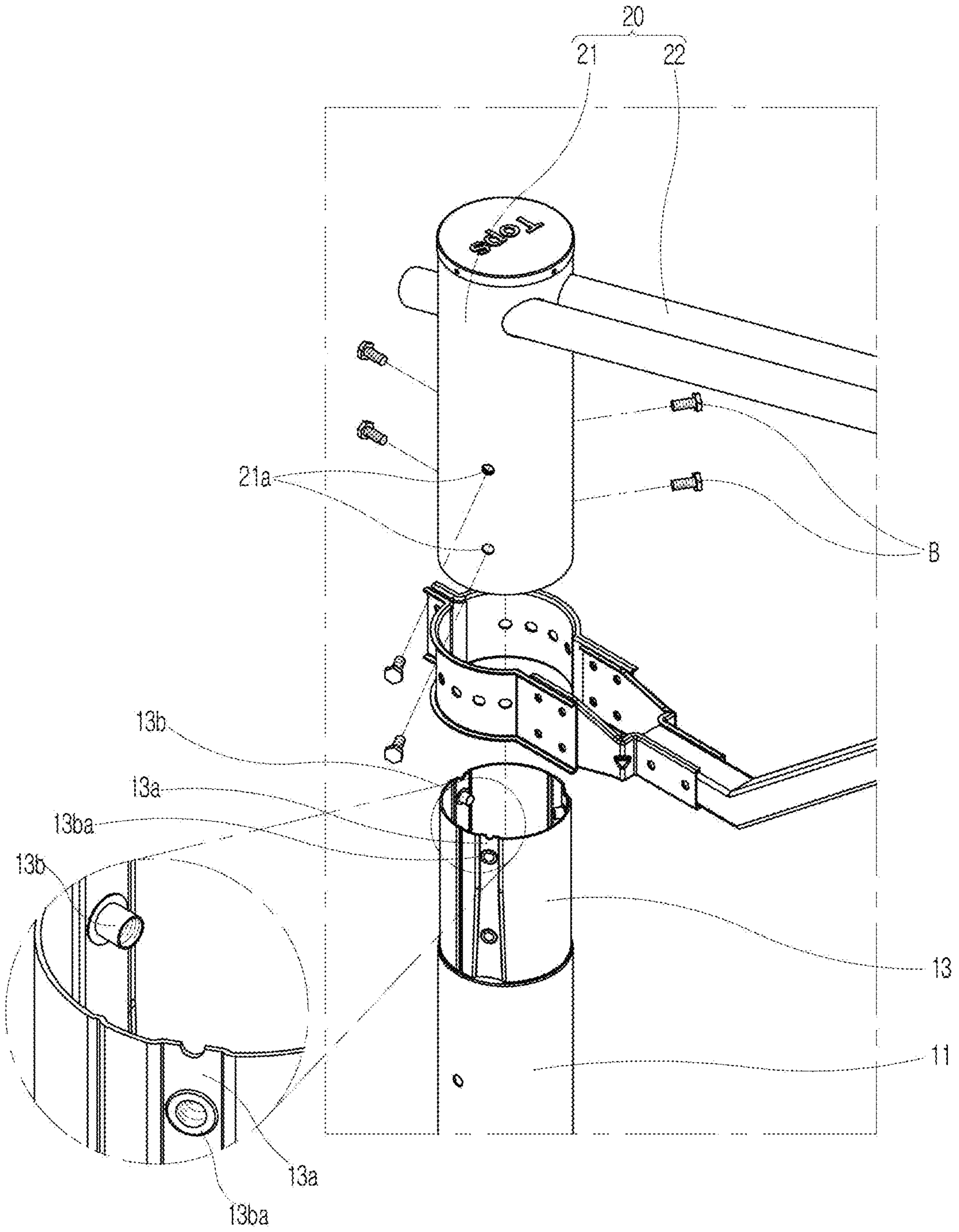
FIG. 4 is a drawing showing a coupling structure between a pole and a support tube according to an embodiment of the present invention.
Figure 5A:
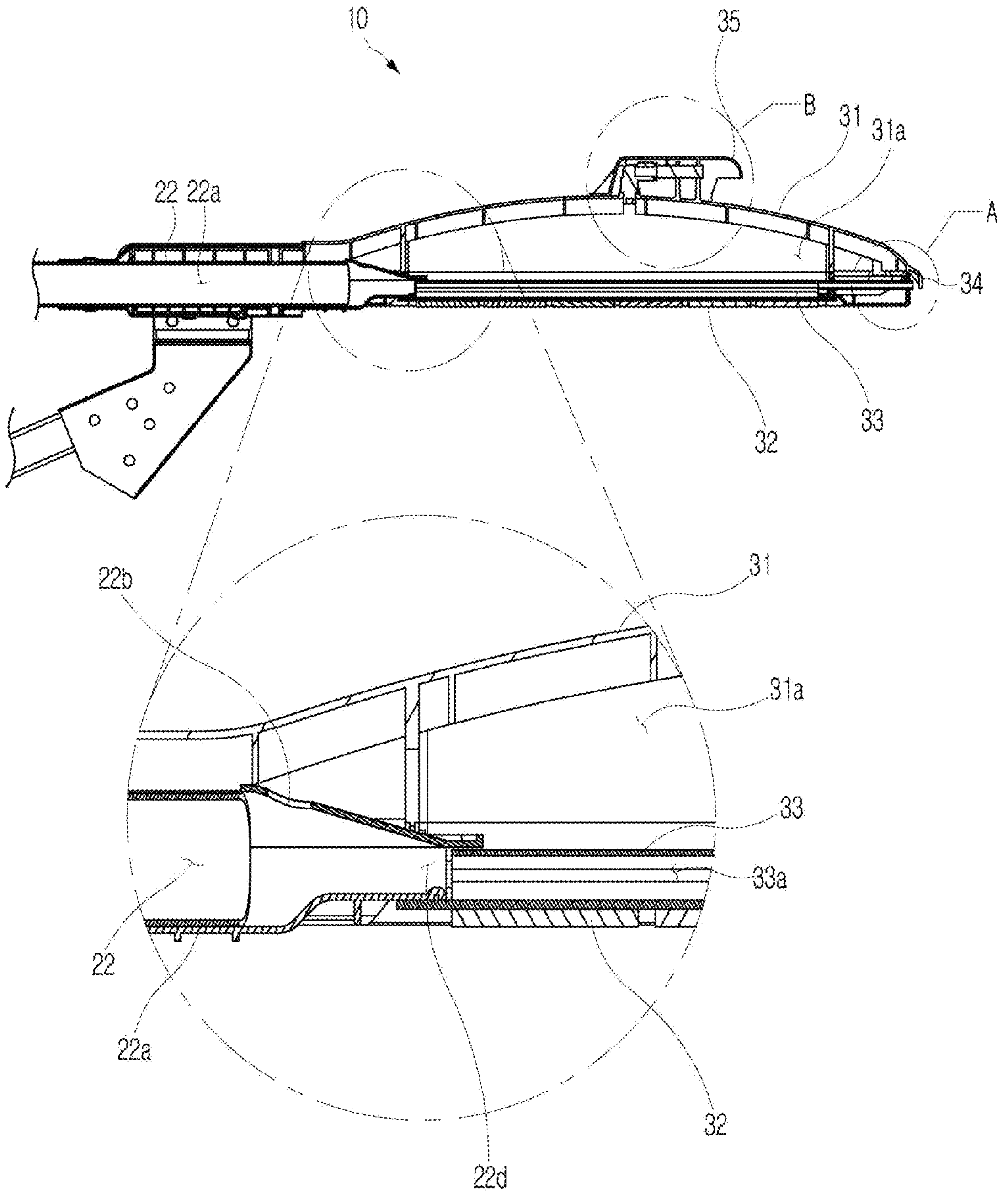
FIG. 5A is a sectional view of a lighting portion according to an embodiment of the present invention.
Figure 5B:
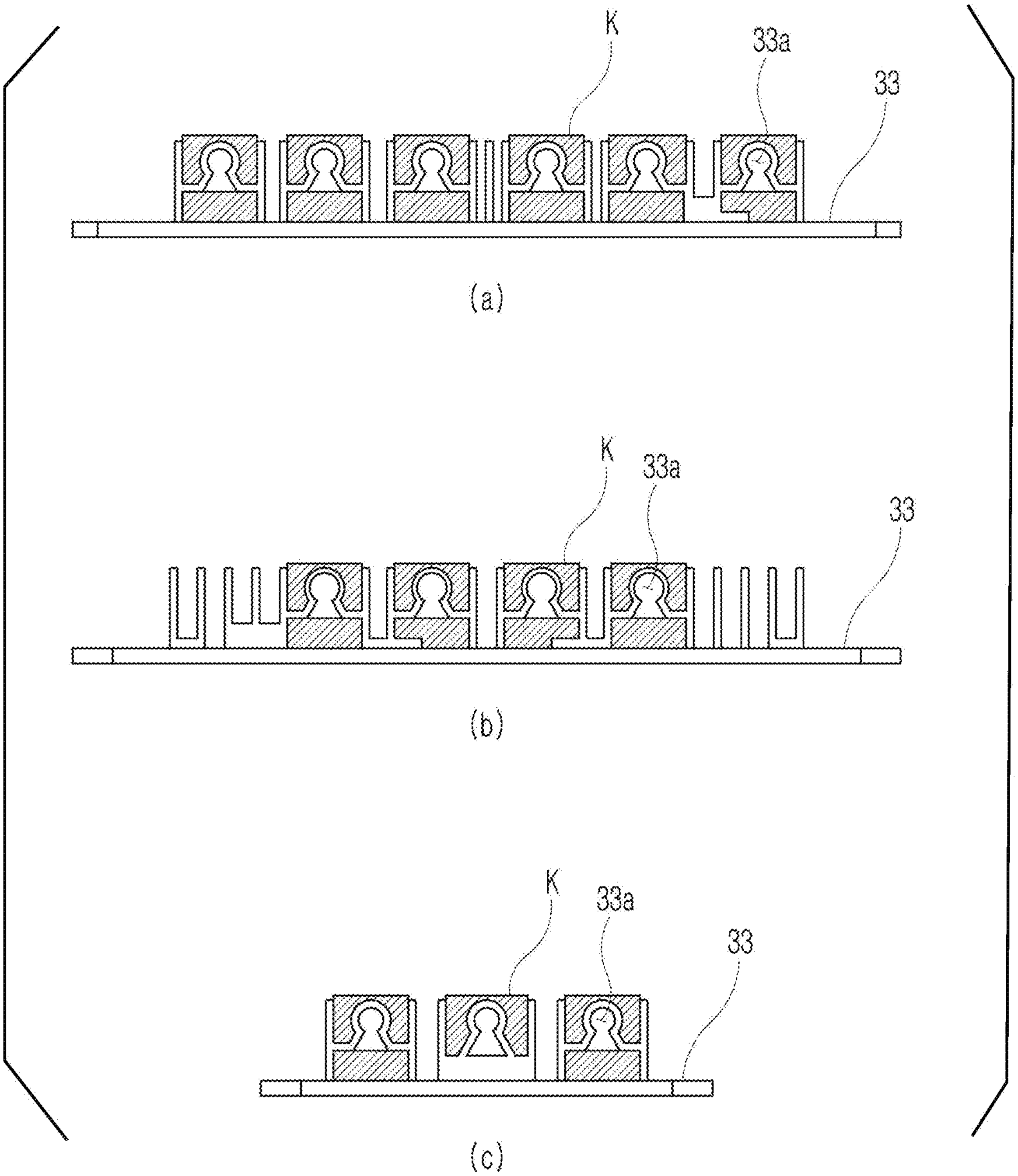
FIG. 5B is a sectional view illustrating various shapes of the heat sink according to an embodiment of the present invention.
Figure 5C:
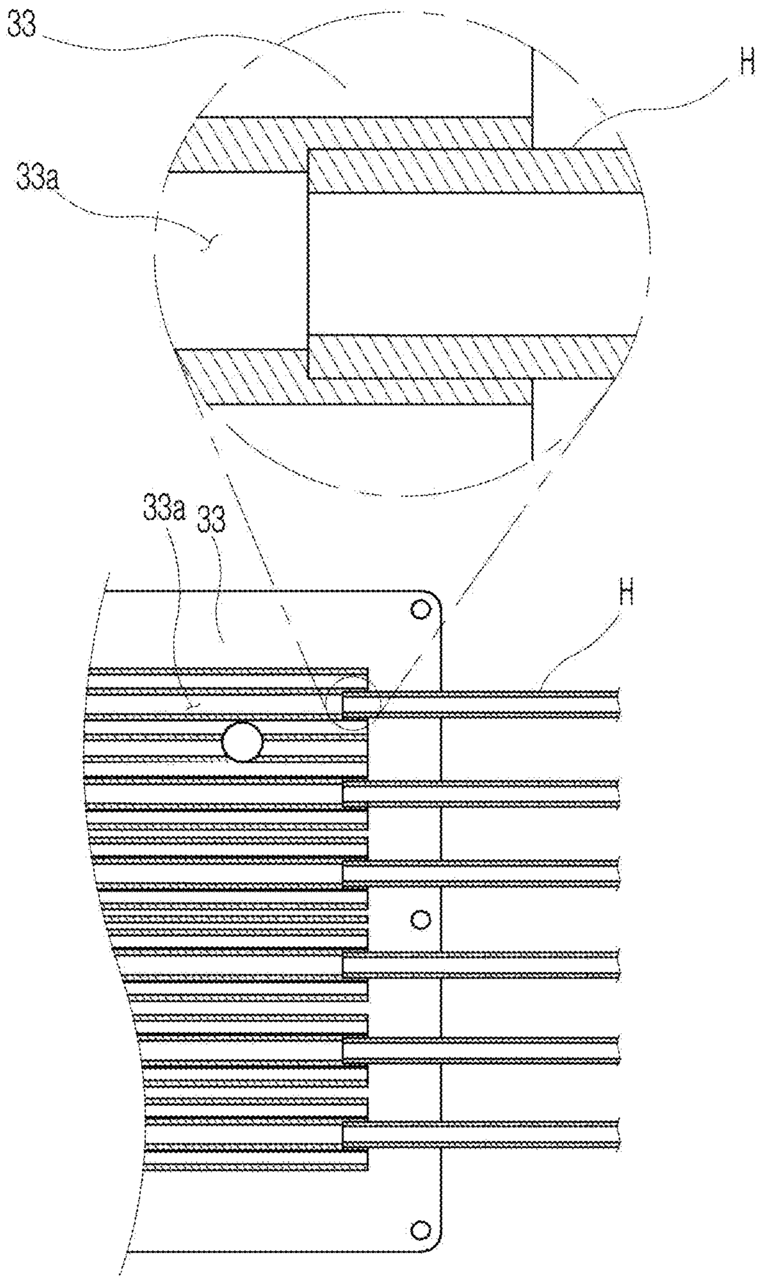
FIG. 5C is a drawing showing a state in which a hose is connected to a heat sink according to an embodiment of the present invention.
Figure 6:
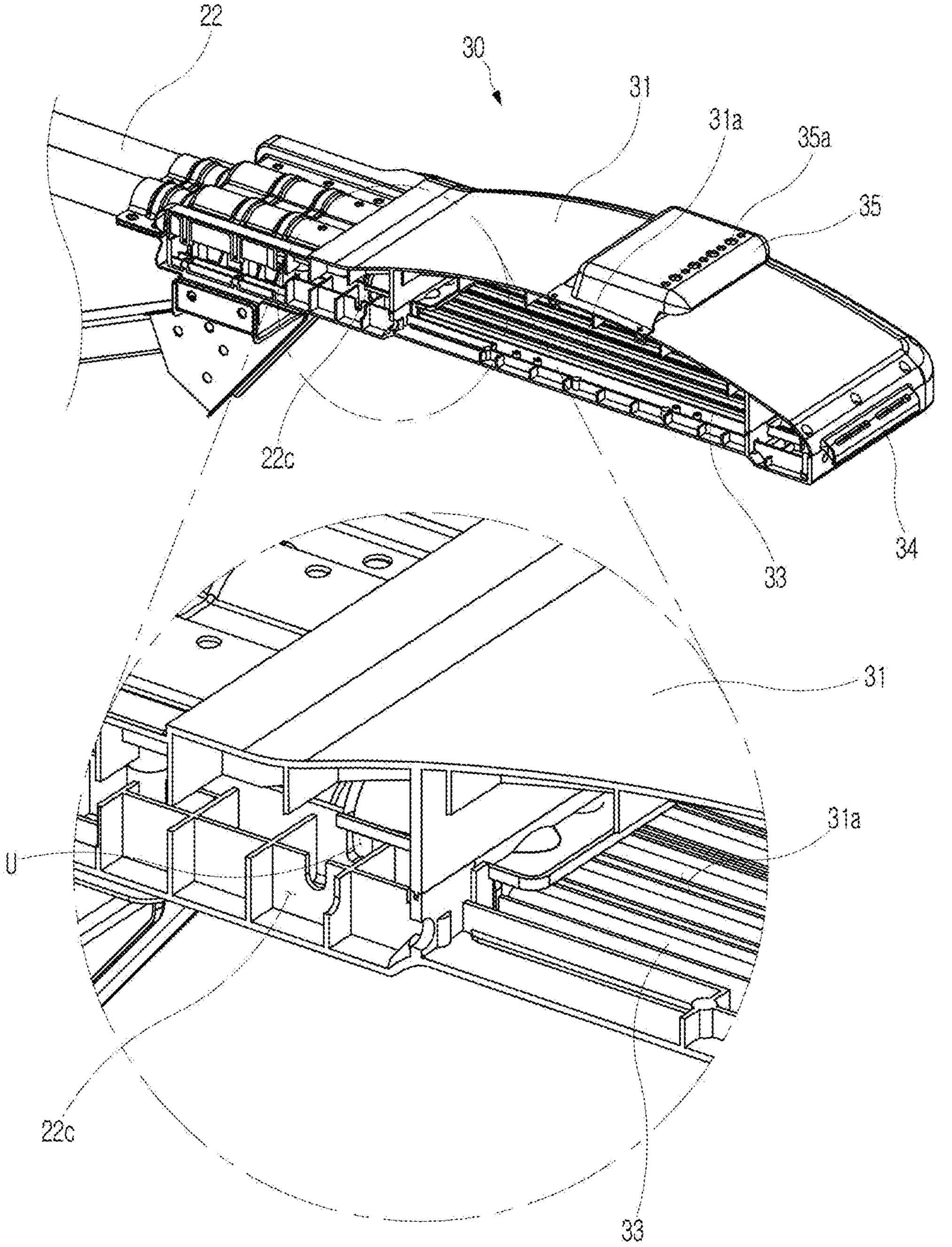
FIG. 6 is a partially sectional perspective view of a lighting portion according to an embodiment of the present invention.
Figure 7A:
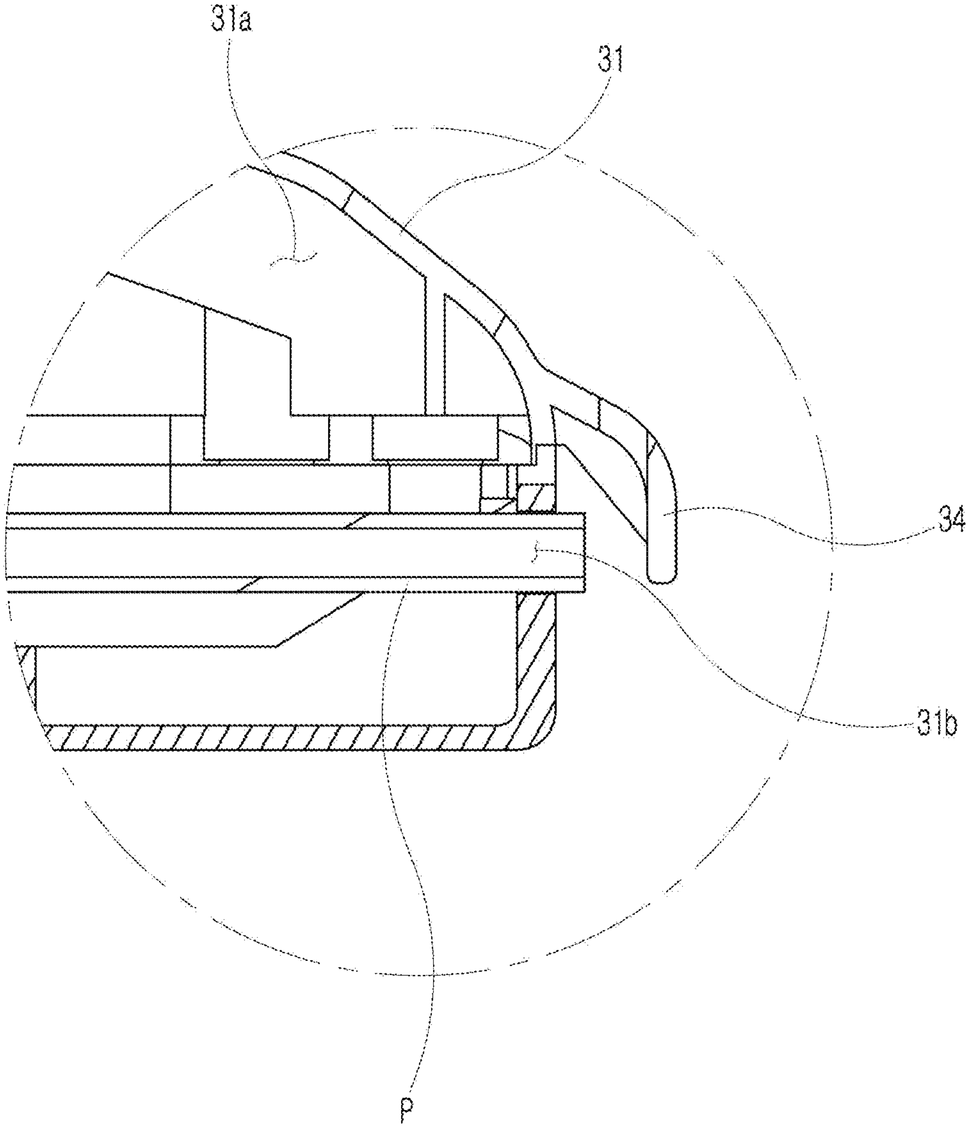
FIG. 7A is an enlarged view of "A" shown in FIG. 5.
Figure 7B:
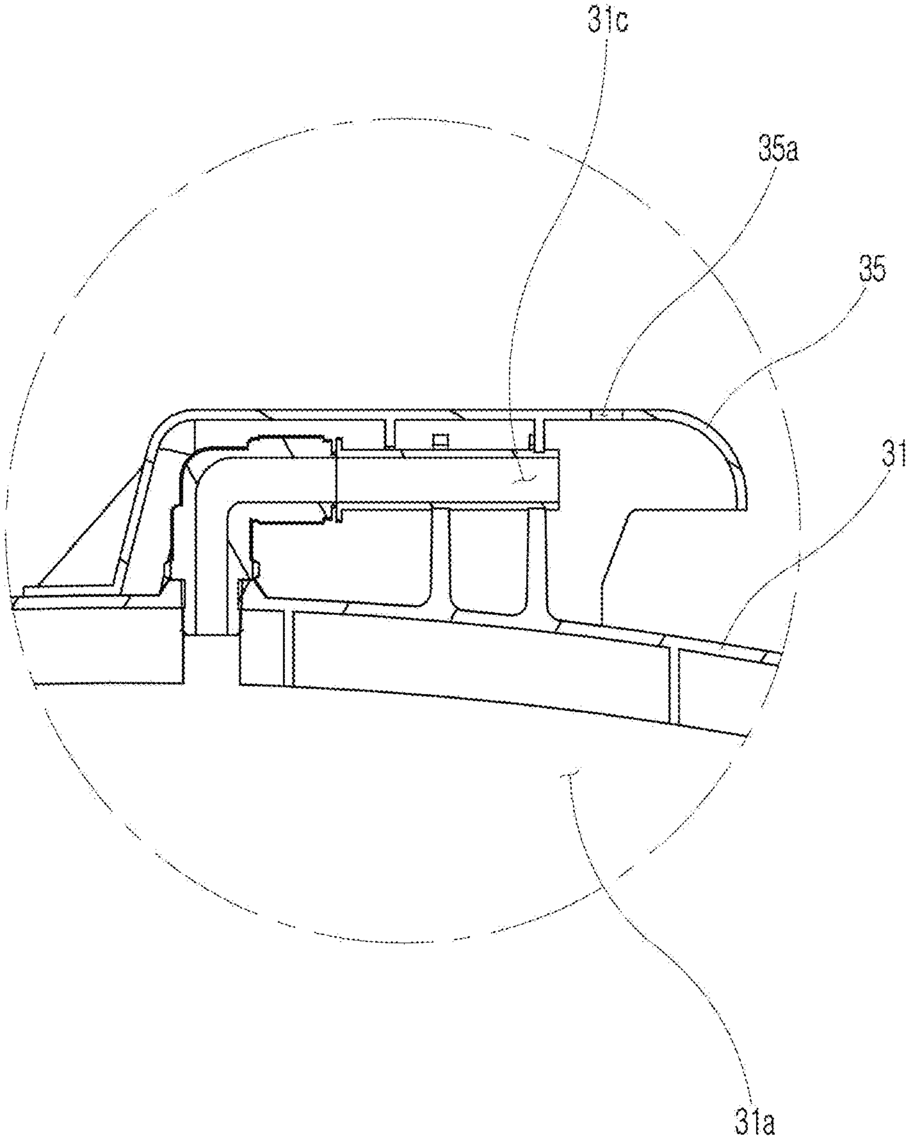
FIG. 7B is an enlarged view of "B" shown in FIG. 5.

FIG. 2 is a perspective view illustrating a streetlight with improved thermal efficiency and extended lifespan according to an embodiment of the present invention; FIG. 3 is a drawing showing a lower portion of a pole according to an embodiment of the present invention; FIG. 4 is a drawing showing a coupling structure between a pole and a support tube according to an embodiment of the present invention; FIG. 5A is a sectional view of a lighting portion according to an embodiment of the present invention; FIG. 5B is a sectional view illustrating various shapes of the heat sink according to an embodiment of the present invention; FIG. 5C is a drawing showing a state in which a hose is connected to a heat sink according to an embodiment of the present invention; FIG. 6 is a partially sectional perspective view of a lighting portion according to an embodiment of the present invention; FIG. 7A is an enlarged view of "A" shown in FIG. 5; and FIG. 7B is an enlarged view of "B" shown in FIG. 5.

As shown in FIG. 2 through FIG. 7B, the streetlight (1) with improved thermal efficiency and extended lifespan according to an embodiment of the present invention includes a pole (10), a support tube (20), and a lighting portion (30).

The pole (10) may include a body portion (11) of which a lower portion is firmly fixed to the ground, a cover (12) coupled to a lower portion of the body portion (11), and an extension portion (13) formed to extend upward from an upper portion of the body portion (11), and serves to support the lighting portion (30) through a support tube (20) described later.

The body portion (11) is formed in a post shape having a length in a substantially vertical direction, and is formed with an inflow port (11*a*) at a lower portion thereof through which external air is introduced, and a hollow portion (11*b*) is formed inside the body portion, so that the introduced external air moves upward.

At this time, the inflow port (11*a*) according to the present embodiment is preferably formed with a plurality of holes having a size smaller than foreign substances in order to prevent foreign substances, insects, amphibians, or the like from entering the inside of the body portion (11), and, in another form, may be configured in a mesh structure for filtering the foreign substances.

Meanwhile, when manufacturing the streetlight of the present invention by modifying a conventional streetlight, the above-described inflow port (11*a*) may not be separately formed, and a storage compartment formed in the lower portion of the conventional pole (10) for accommodating a ballast may be used as an air inflow means.

The cover (12), as shown in FIG. 3, is installed on one outer side of the lower portion of the body portion (11) where the inflow port (11*a*) is formed, so as to shield an outer space of the inflow port (11*a*), and an air inlet (12*a*) is formed at a lower portion of the cover (12). The cover (12) serves to block the external air from directly entering the inflow port (11*a*), and to allow the external air introduced through the air inlet (12*a*) formed at the lower portion to change its inflow path toward the inflow port (11*a*), so that the airflow bends at least once, thereby minimizing the inflow of the foreign substances into the interior of the pole (10) while still allowing smooth inflow of the external air.

In particular, in cases where sandstorms, which frequently occur in countries such as the Middle East, Africa, and Mongolia, enter the inside of the body portion (11), the cover (12) allows the inflow path of the external air to bend at least once, so that large sand particles fall downward by gravity and accumulate inside the base block, while the air can easily move upward through the pole (10).

The extension portion (13) is formed to extend upward from an upper portion of the body portion (11), and a plurality of recessed portions (13*a*), which are recessed inward along the longitudinal direction on its outer surface, is formed so that the extension portion has an outer diameter smaller than that of the body portion (11), and preferably, the extension portion is formed to have an outer diameter corresponding to the inner diameter of the coupling portion (21) of the support tube (20), which will be described later.

In addition, the extension portion (13) is integrally formed with a nut member (13*b*) having a nut hole (13*ba*) formed on one side thereof, and the coupling portion (21), in a state of being fitted onto the extension portion, is coupled to the nut member (13*b*) through a fastening member such as a bolt.

The support tube (20) includes a coupling portion (21), which is inserted into and coupled to the extension portion (13), and an air transfer pipe (22), which is formed to extend outward from one side of the coupling portion (21) toward the outside of the pole (10). The support tube (20) serves not only to support the lighting portion (30), which will be described later, but also to provide a path for external air passing through the hollow portion (11*b*), so that the external air can be transferred to the lighting portion (30).

Here, as shown in FIG. 4, the coupling portion (21) is formed in a cylindrical shape having a lower portion that is substantially open and having an inner diameter corresponding to the outer diameter of the extension portion (13). A coupling hole (21*a*) is formed in a region corresponding to the nut hole (13*ba*) of the nut member (13*b*) that is integrally formed on one side of the extension portion (13). The coupling portion (21) is firmly coupled to the extension portion (13) by a fastening means (B), such as a bolt, which is coupled to the nut member (13*b*) through the coupling hole (21*a*).

By virtue of the nut member (13*b*) being integrally formed on one side of the extension portion (13), the coupling portion (21) can be easily coupled to the extension portion (13) merely by fastening the fastening means (B) to the coupling portion (21) and the extension portion (13), while also allowing the coupling portion (21) and the extension portion (13) to be coupled more firmly.

The coupling portion (21) provides a firm coupling force between the air transfer pipe (22) and the pole (10), thereby enabling the air transfer pipe (22) to firmly support the lighting portion (30) that is coupled to its rear end.

The air transfer pipe (22) is formed in a pipe shape having an air transfer passage (22*a*) formed therein, and one end thereof is integrally installed on the coupling portion (21), so that the hollow portion (11*b*) of the pole (10) communicates with the air transfer passage (22*a*), while the other end is formed to extend outward from the pole (10).

The air transfer pipe (22) is formed with a first through hole (22*b*) at an upper portion of its other end, the first through hole communicating with a heat dissipation space (31*a*) of a case (31) of the lighting portion (30), which will be described later. In addition, a second through hole (22*c*) is formed at a side portion of the air transfer pipe (22) to communicate laterally with the heat dissipation space (31*a*), and a third through hole (22*d*) is formed at a front end of the air transfer pipe (22) to communicate with the inside of a heat sink (33), which will be described later.

That is, the air transfer pipe (22) serves to allow the external air introduced from the pole (10) to be branched, so that it can move to the heat sink (33) of the lighting portion (30) and to the heat dissipation space (31*a*) of the case (31).

The lighting portion (30) includes a case (31), a lighting unit (32) installed on one side of an open lower surface of the case (31), a heat sink (33) installed inside the case (31) above the lighting unit (32), a first shielding portion (34) formed at a front end of the case (31), and a second shielding portion (35) formed at an upper portion of the case (31), and serves to emit light downward to illuminate a predetermined illumination area.

The case (31) has a heat dissipation space (31*a*) formed therein and has an open lower surface, and one side of its rear end is coupled to the front end of the support tube (20), so that it is supported on the pole (10) through the support tube (20).

As shown in FIGS. 5A and 6, the case (31) is configured such that the first through hole (22*b*) of the support tube (20) communicates with the heat dissipation space (31*a*), and an air passage (U) leading to the heat dissipation space (31*a*) is formed on one side corresponding to the second through hole (22*c*), thereby allowing the second through hole (22*c*) to communicate with the heat dissipation space (31*a*) from a lateral direction. In addition, the third through hole (22*d*) communicating with the heat sink (33), which will be described later, is formed at the front end of the case (31).

As shown in FIG. 7A and FIG. 7B, the case (31) is further formed with a first air discharge port (31*b*) at its front end, through which the external air that has passed through the heat sink (33) is discharged, and a second air discharge port (31*c*) at one side of its upper surface, through which the external air that has passed forward through the heat dissipation space (31*a*) is discharged.

Referring again to FIG. 5A, the lighting unit (32) may be a lighting module using an LED as a light source, and is installed on one side of the open lower surface of the case (31) so as to emit light downward to illuminate a predetermined illumination area.

Since such a lighting unit (32) is well known in the art to the extent that a person of ordinary skill in the relevant technical field can readily purchase and use a commercially available product, a detailed description of its specific configuration will be omitted.

The heat sink (33) is installed inside the case (31) above the lighting unit (32) and serves to release to the outside the heat generated from the lighting unit (32). In the present embodiment, a flow path (33*a*) for air flow is formed inside the heat sink (33), and one end of the heat sink (33) is connected to the front end of the support tube (20) such that the third through hole (22*d*) communicates with the flow path (33*a*). The other end of the heat sink (33) is connected to one inner side of the case (31) where the first air discharge port (31*b*) is formed so that the first air discharge port (31*b*) communicates with the flow path (33*a*).

The heat sink (33) according to the present embodiment can increase the thermal efficiency of the lighting unit (32), since it is cooled by heat exchange not only with the external air that has moved along the support tube (20) and is introduced into the interior of the case (31), but also with the air introduced into the heat dissipation space (31*a*) of the case (31), thereby achieving heat exchange from both inside and outside thereof.

In addition, as shown in FIG. 5B, the heat sink (33) may be formed in various shapes. However, the shape of the heat sink (33) according to the present invention is not limited thereto, and any shape may be adopted as long as it has a heat dissipation structure.

Furthermore, it is preferable that, in the front-end cross-section of the heat sink (33) that is connected to the support tube (20), a region other than the flow path (33*a*) is shielded with a separate rubber cap (K) so that external air can be introduced into the interior of the heat sink (33) from the support tube (20) without leakage.

The heat sink (33) may also preferably be connected to the first air discharge port (31*b*) through a hose (H) at its other end, such that, as shown in FIG. 5C, the end of the hose (H) is forcibly press-fitted into the other end of the heat sink (33) in a one-touch manner. This improves the coupling force between the hose (H) and the heat sink (33), thereby allowing the air that has passed through the heat sink (33) to be more stably transferred to the first air discharge port (31*b*).

Referring to FIG. 7A, which is an enlarged view of portion A of FIG. 5A, the first shielding portion (34) is formed to extend forward from the upper front end of the case (31) and is bent downward to shield the front of the first air discharge port (31*b*), thereby guiding the external air discharged from the first air discharge port (31*b*) to be discharged downward from the lighting portion (30).

Referring to FIG. 7B, which is an enlarged view of portion B of FIG. 5A, the second shielding portion (35) is formed to extend forward from one upper side of the case (31) and is bent downward to shield the front of the second air discharge port (31*c*). A plurality of discharge holes (35*a*) is formed on one upper side of the second shielding portion (35), thereby allowing the external air discharged from the second air discharge port (31*c*) to be discharged either upward or downward from the case (31).

The first shielding portion (34) and the second shielding portion (35) serve to ensure smooth airflow within the streetlight (1) with improved thermal efficiency and extended lifespan according to an embodiment of the present invention by shielding the front of the first and second air discharge ports (31*b* and 31*c*). A more detailed description of this will be provided in the operation section described later.

Figure 8:
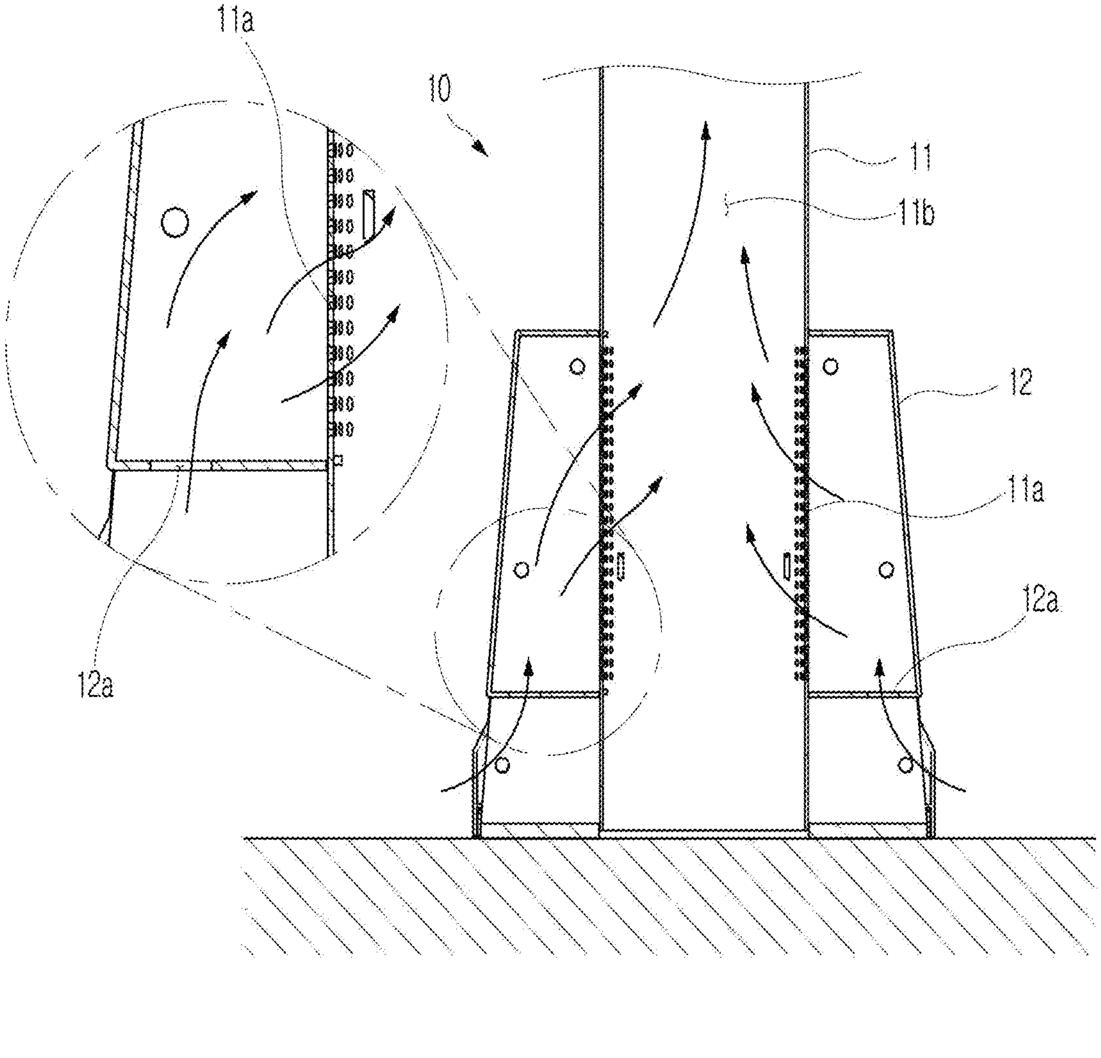
FIG. 8 is a drawing illustrating a state in which an external air is introduced into an interior of a pole according to an embodiment of the present invention.
Figure 9:
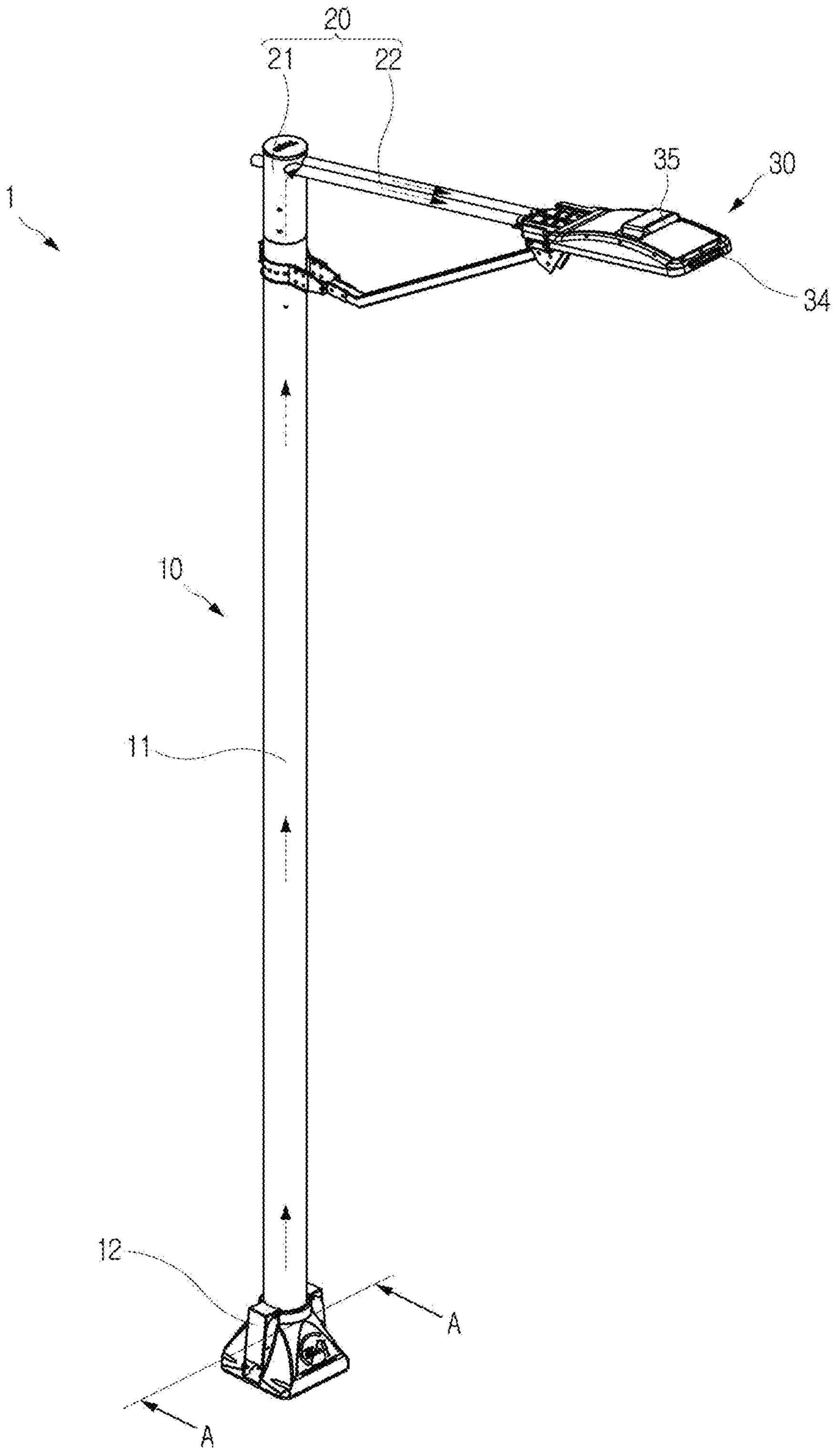
FIG. 9 is a drawing illustrating a state in which an external air moves from a pole to a support tube according to an embodiment of the present invention.
Figure 10A:
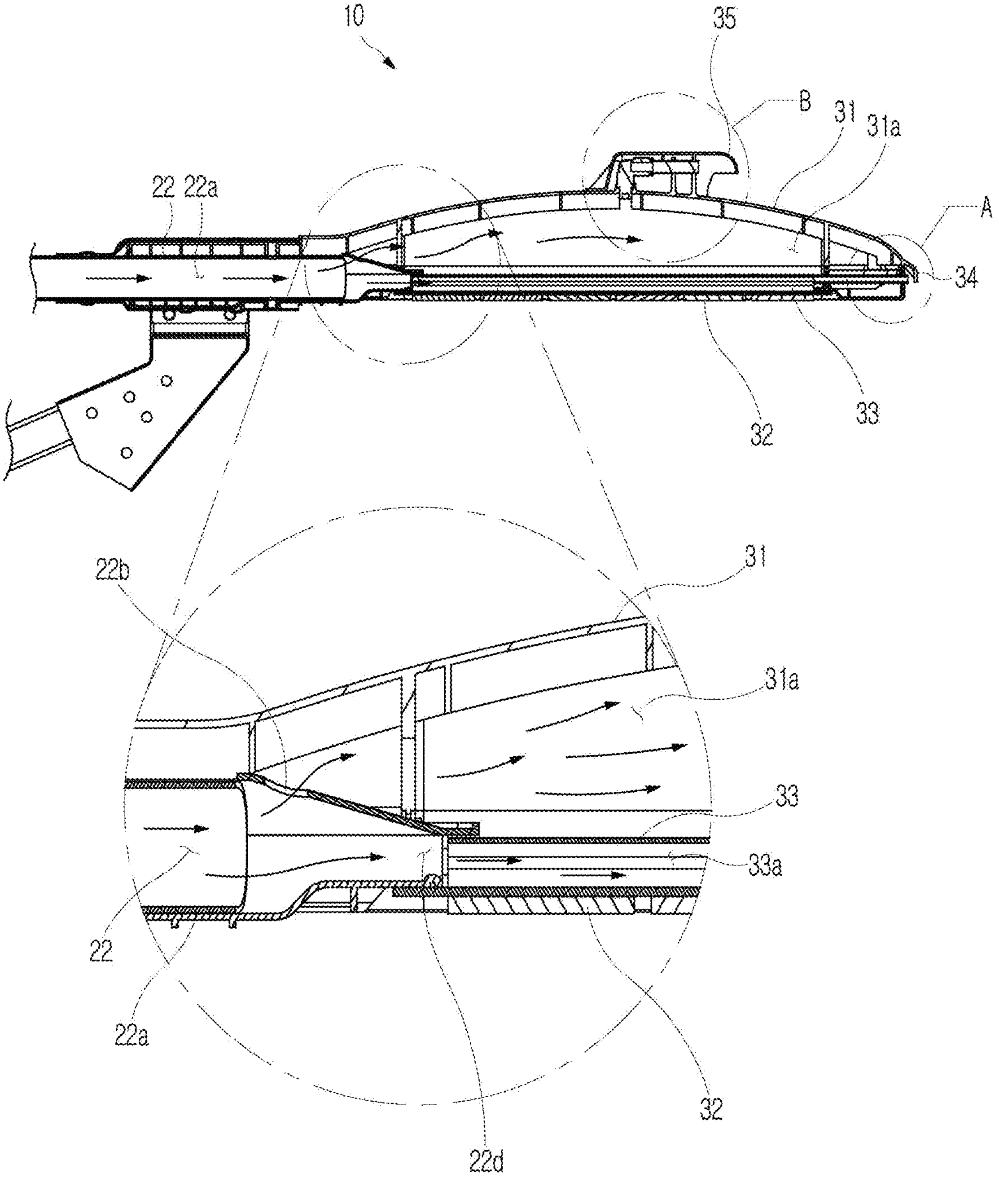
FIG. 10A and FIG. 10B are drawings illustrating a state in which an external air moving along a support tube is branched and introduced into a heat dissipation space and the interior of a heat sink through first to third through holes.
Figure 10B:
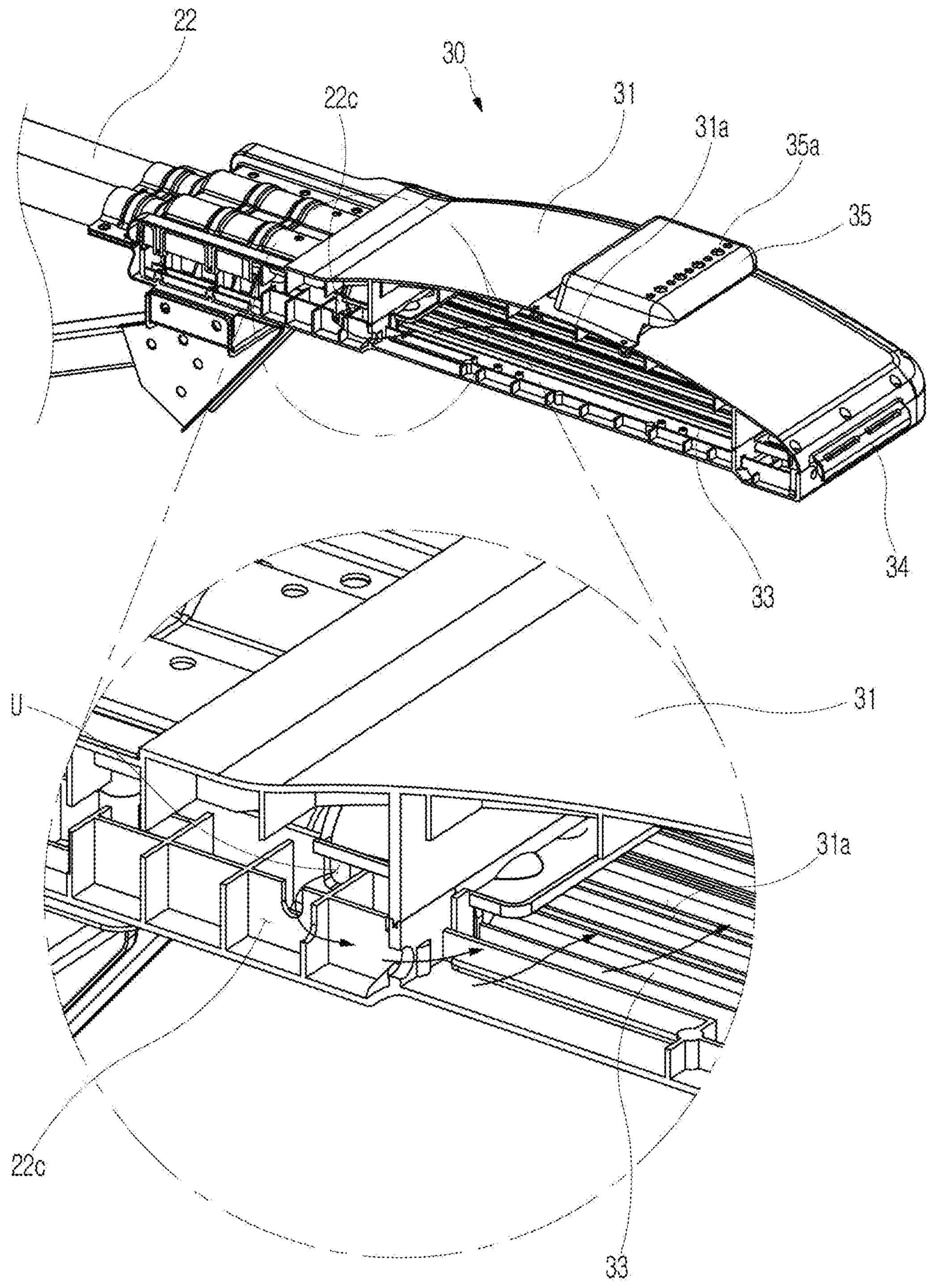
Figure 11A:
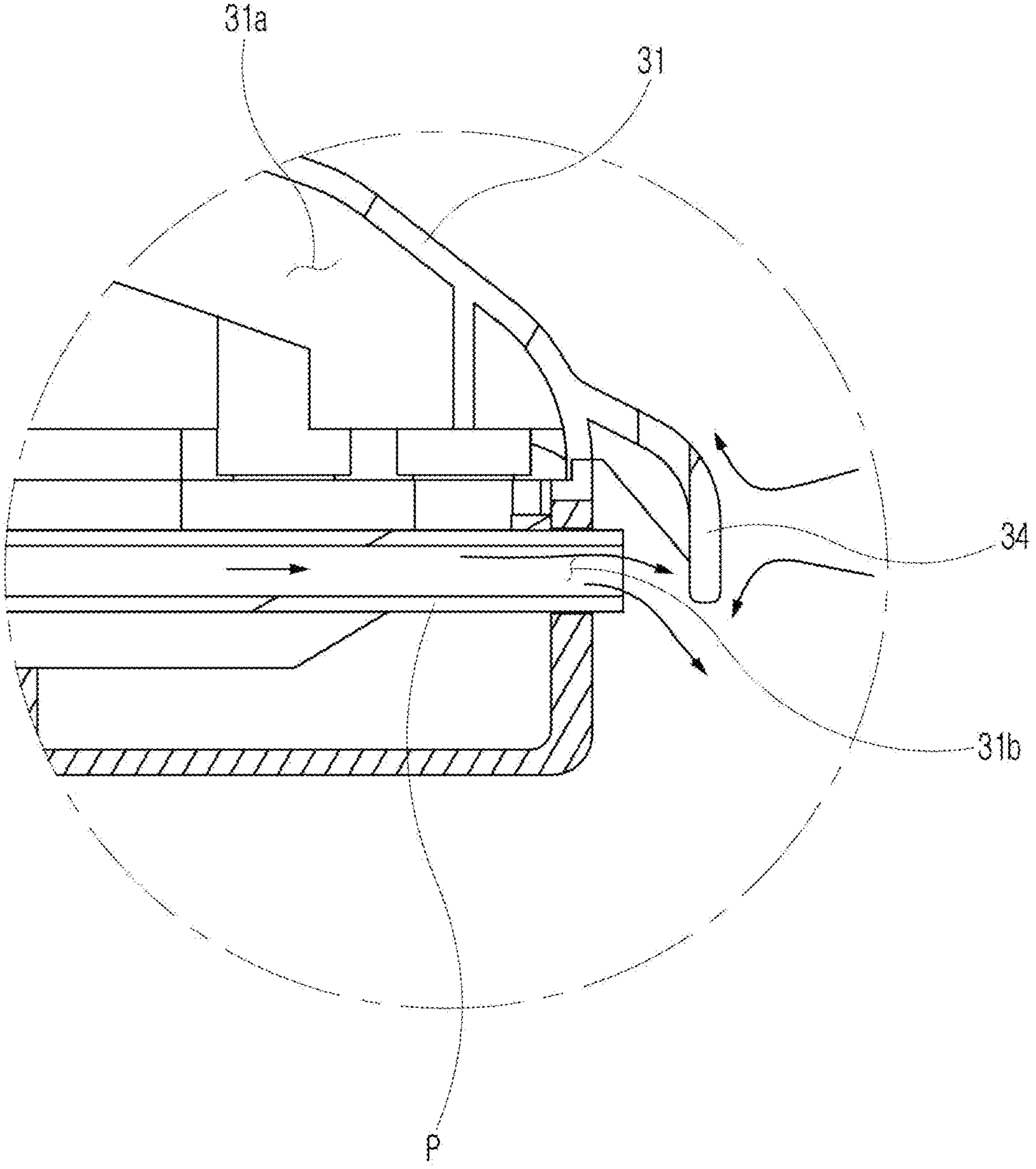
FIG. 11A and FIG. 11B are drawings illustrating a state in which an external air is discharged from a first air discharge port and a second air discharge port according to an embodiment of the present invention.
Figure 11B:
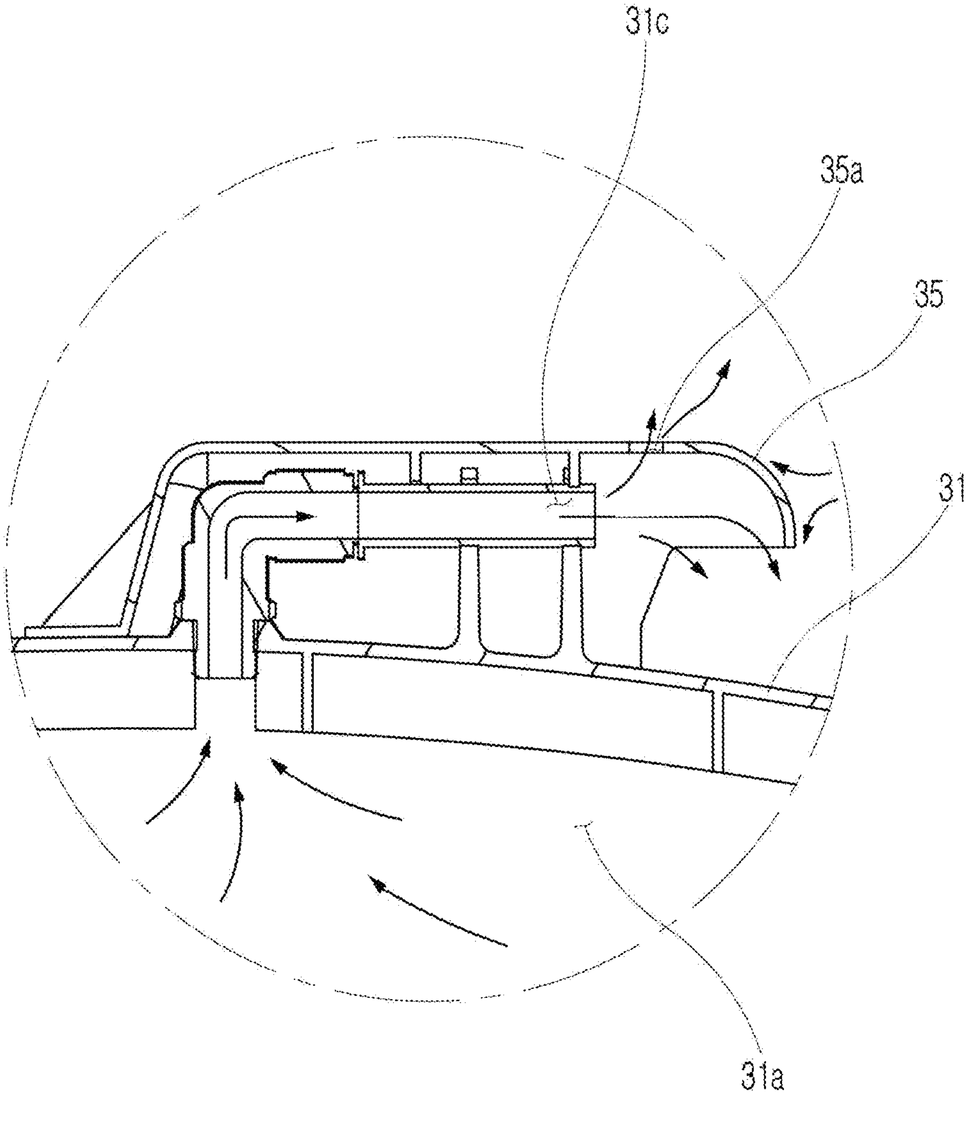

FIG. 8 is a drawing illustrating a state in which an external air is introduced into an interior of a pole according to an embodiment of the present invention; FIG. 9 is a drawing illustrating a state in which an external air moves from a pole to a support tube according to an embodiment of the present invention; FIG. 10A and FIG. 10B are drawings illustrating a state in which an external air moving along a support tube is branched and introduced into a heat dissipation space and the interior of a heat sink through first to third through holes; and FIG. 11A and FIG. 11B are drawings illustrating a state in which an external air is discharged from a first air discharge port and a second air discharge port according to an embodiment of the present invention.

The heat dissipation operation of the streetlight (1) with improved thermal efficiency and extended lifespan according to an embodiment of the present invention, which has the above structure, will now be described with reference to FIG. 8 to FIG. 11B.

The streetlight (1) with improved thermal efficiency and extended lifespan according to the present embodiment emits light from the lighting unit (32) to illuminate a predetermined illumination area, and the heat is generated during the light emission of the lighting unit (32).

At this time, as the hot air inside the lighting portion (30) is discharged to the first and second air discharge ports (31*b* and 31*c*) due to convection, the external air is introduced through the air inlet (12*a*) of the cover (12) installed at the lower portion of the pole (10). The air is introduced into the inflow port (11*a*) through the interior of the cover (12) and flows into the interior of the pole (10).

The external air introduced into the interior of the pole (10) moves upward along the pole (10), as shown in FIG. 8, and as shown in FIG. 9, is introduced into the air transfer pipe (22) of the support tube (20) coupled to the upper portion of the pole (10).

The external air introduced into the air transfer pipe (22) moves along the air transfer passage (22*a*) in the air transfer pipe (22) and is then branched into the first to third through holes.

The external air introduced through the first through hole (22*b*) is introduced into the heat dissipation space (31*a*) of the case (31) communicating therewith, and the external air introduced through the second through hole (22*c*) is introduced into the heat dissipation space (31*a*) from the side thereof through the air passage (U) formed in the interior of the case (31). The external air introduced through the third through hole (22*d*) is introduced into the interior of the heat sink (33).

To further describe the heat dissipation operation of the lighting portion (30) by the branched external air, the external air introduced into the interior of the heat sink (33) through the third through hole (22*d*) performs a first cooling by exchanging heat with the heat sink (33) from the inside, and the external air introduced into the heat dissipation space (31*a*) of the case (31) through the first and second through holes (22*b* and 22*c*) performs a second cooling by exchanging heat with the heat sink (33) from the outside.

Thus, in the present embodiment, the branched external airs cool the heat sink (33) simultaneously from both the inside and outside, thereby maximizing the heat dissipation performance of the heat sink (33), preventing overheating of the lighting unit (32), and maintaining the maximum performance of the lighting unit (32).

The external air that has passed through the interior of the heat sink (33) is discharged to the outside through the first air discharge port (31*b*). The discharge direction is changed by the first shielding portion (34) disposed in front of the first air discharge port (31*b*), allowing the external air to be discharged downward from the lighting portion (30).

The external air that has passed through the heat dissipation space (31*a*) is discharged to the outside through the second air discharge port (31*c*) formed on the upper portion of the case (31). The discharge direction is also modified by the second shielding portion (35) disposed in front of the second air discharge port (31*c*), resulting in downward discharge as well as upward discharge through the discharge holes (35*a*) formed on the upper portion of the second shielding portion (35).

The reason for arranging the first and second shielding portions in front of the first and second air discharge ports (31*b* and 31*c*) to change the discharge path of external air is that, when wind blows toward the first air discharge port (31*b*) or the second air discharge port (31*c*) due to external environmental factors, the airflow of external air discharged from the first or second air discharge port (31*c*) collides with the wind flow, thereby delaying or disturbing the discharge operation of the external air. As a result, the airflow inside the pole (10), the support tube (20), and the lighting portion (30) cannot be smoothly maintained, which may significantly reduce the heat dissipation efficiency. Accordingly, by blocking the wind blowing toward the first air discharge port (31*b*) or the second air discharge port (31*c*) and changing the discharge direction of the external air being discharged so as to prevent collision between the wind and the discharged external air, the external air can be smoothly discharged, thereby preventing a reduction in the heat dissipation efficiency of the lighting portion (30) that would otherwise occur due to delayed discharge of the external air.

Figure 12:
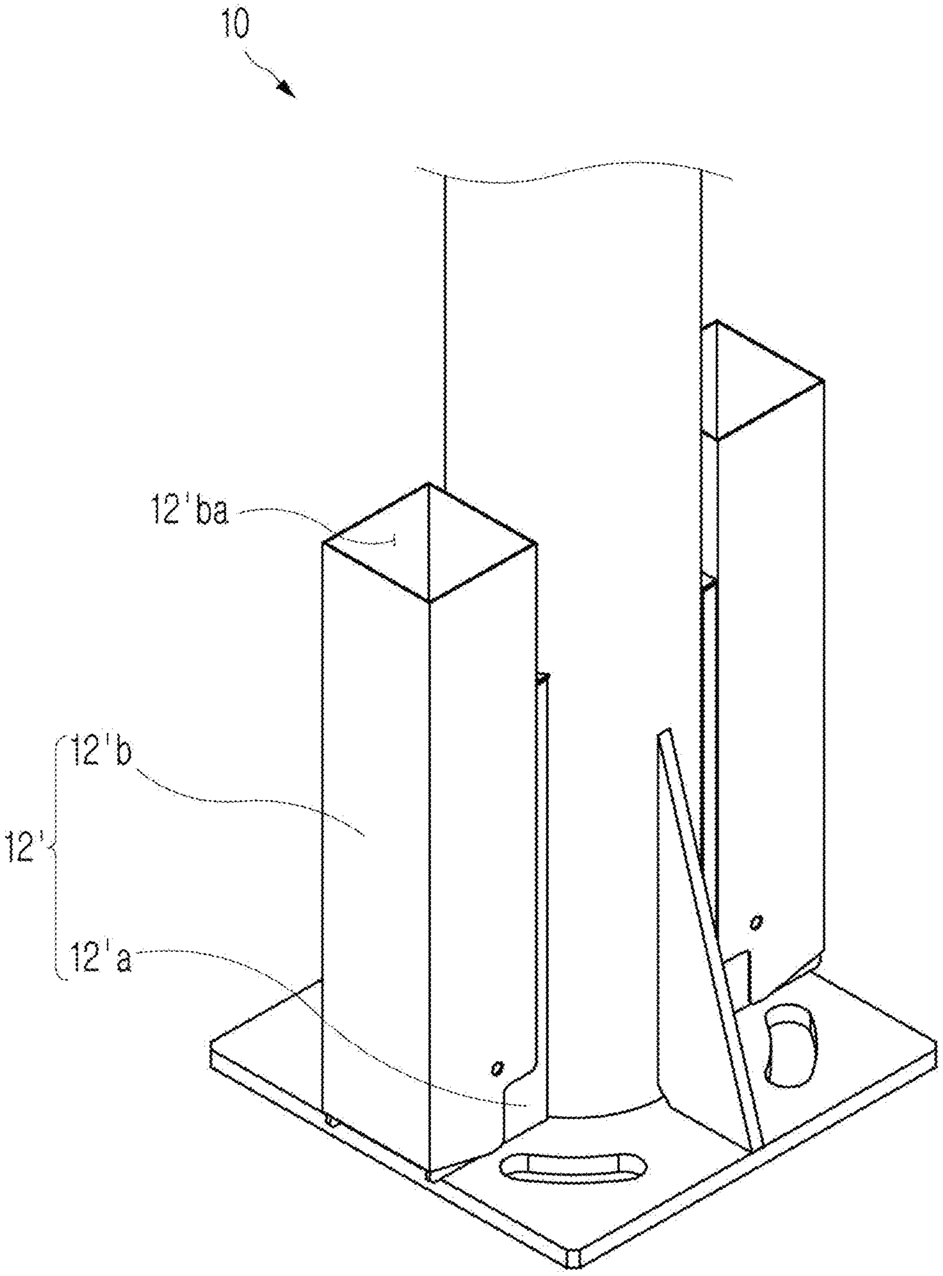
FIG. 12 is a perspective view of a cover installed at a lower portion of a pole according to another embodiment of the present invention.
Figure 13:
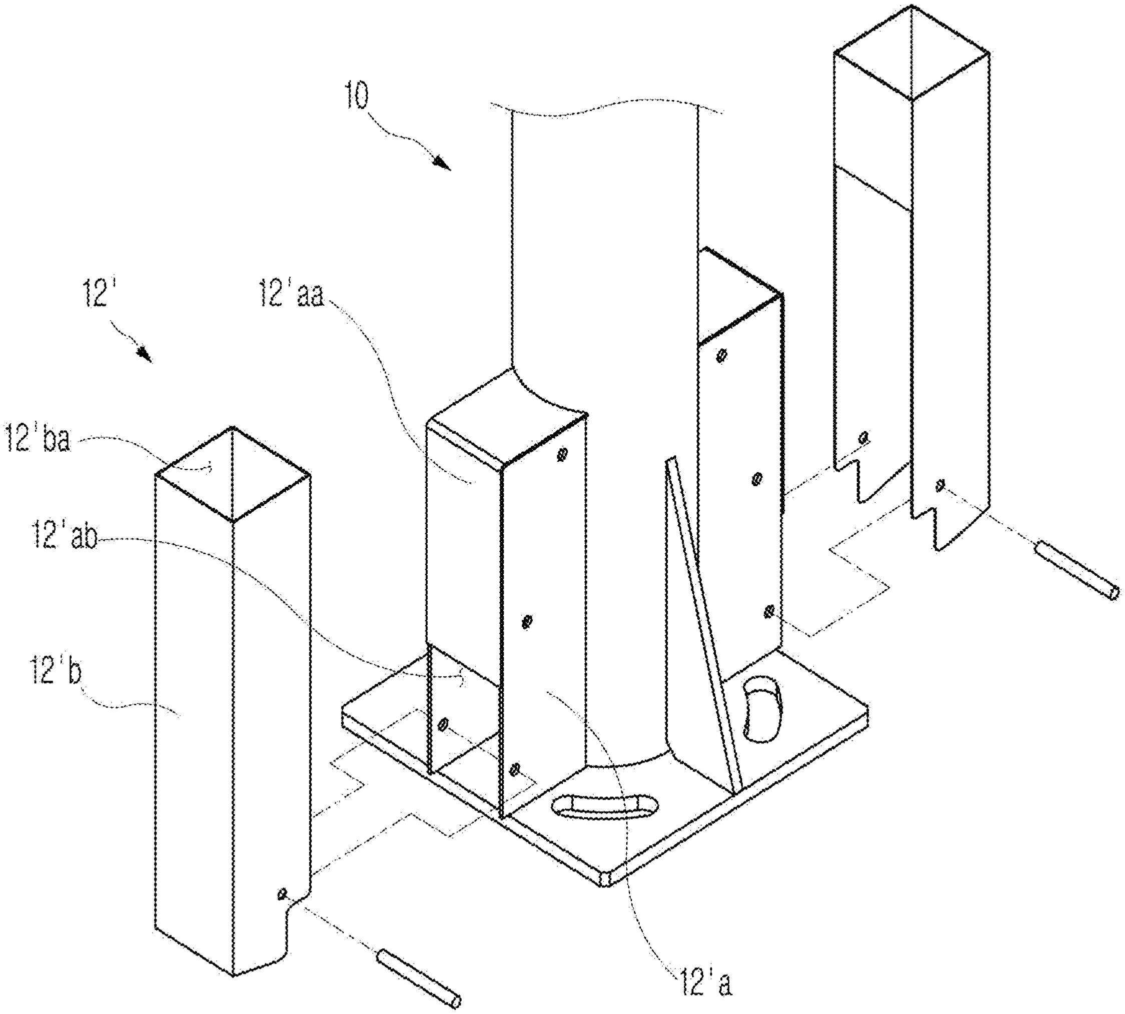
FIG. 13 is an exploded perspective view of a cover installed at a lower portion of a pole according to another embodiment of the present invention.
Figure 14A:
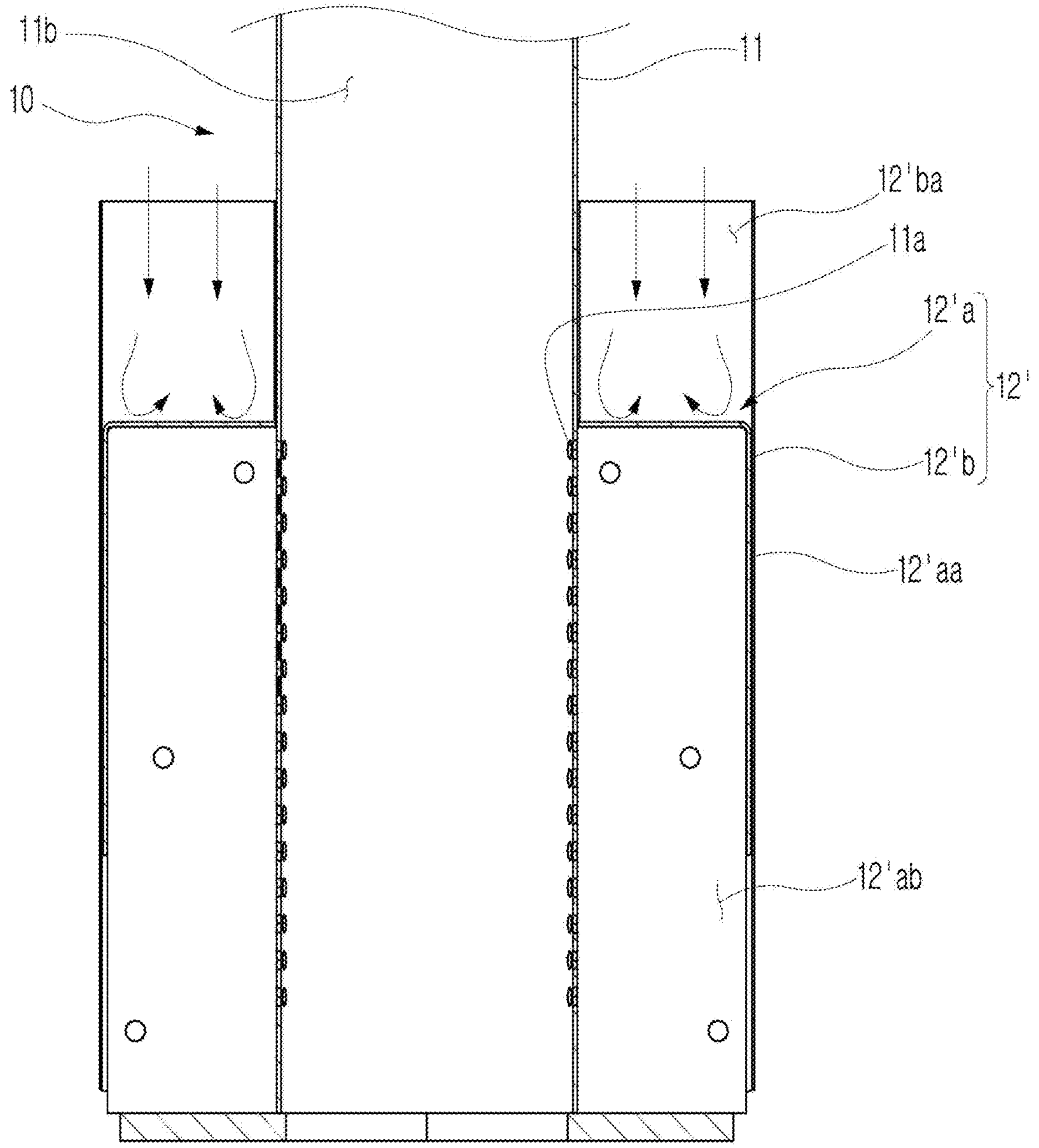
FIG. 14A and FIG. 14B are drawings illustrating a state in which a second body portion of a cover installed at a lower portion of a pole rotates according to another embodiment of the present invention.
Figure 14B:
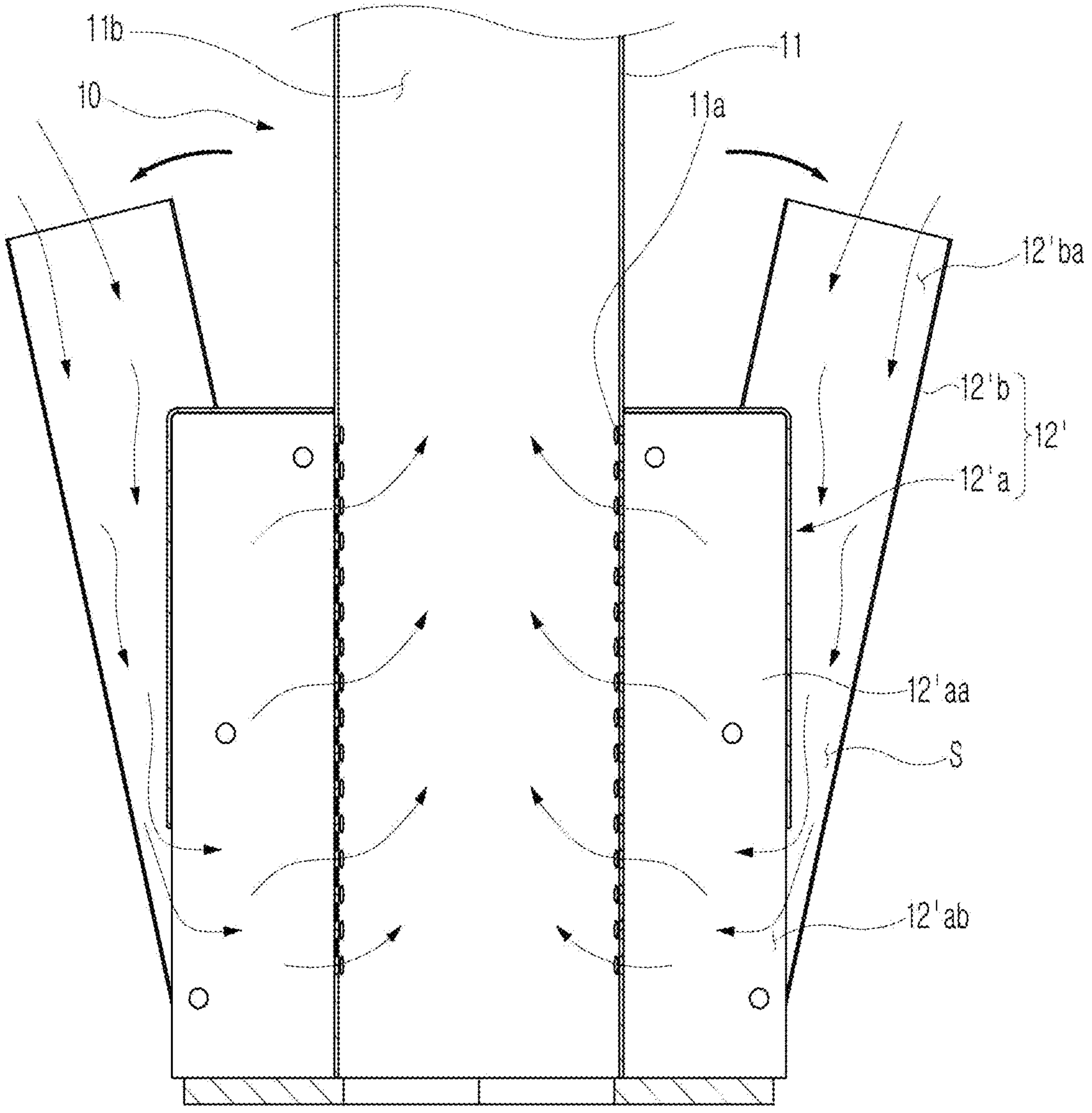
Figure 15A:
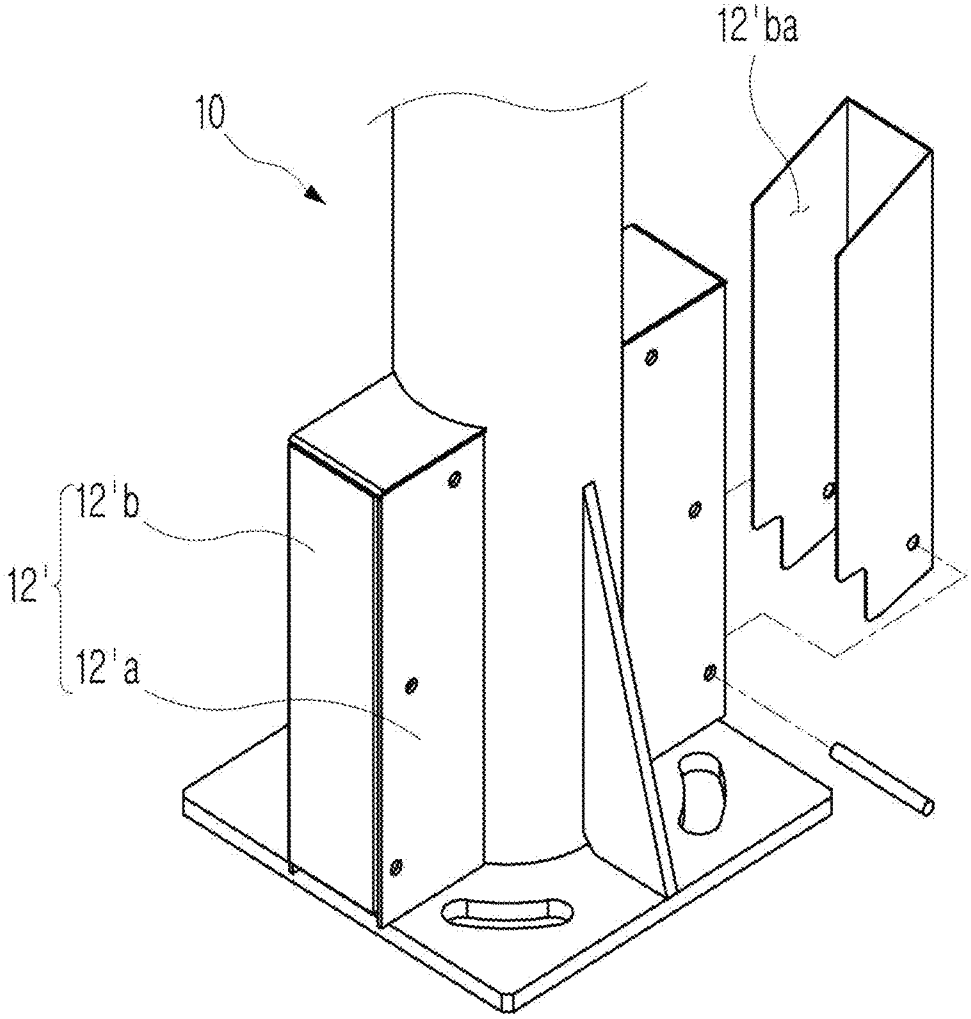
FIG. 15A through FIG. 15C are drawings illustrating a cover configured in different forms according to another embodiment of the present invention.
Figure 15B:
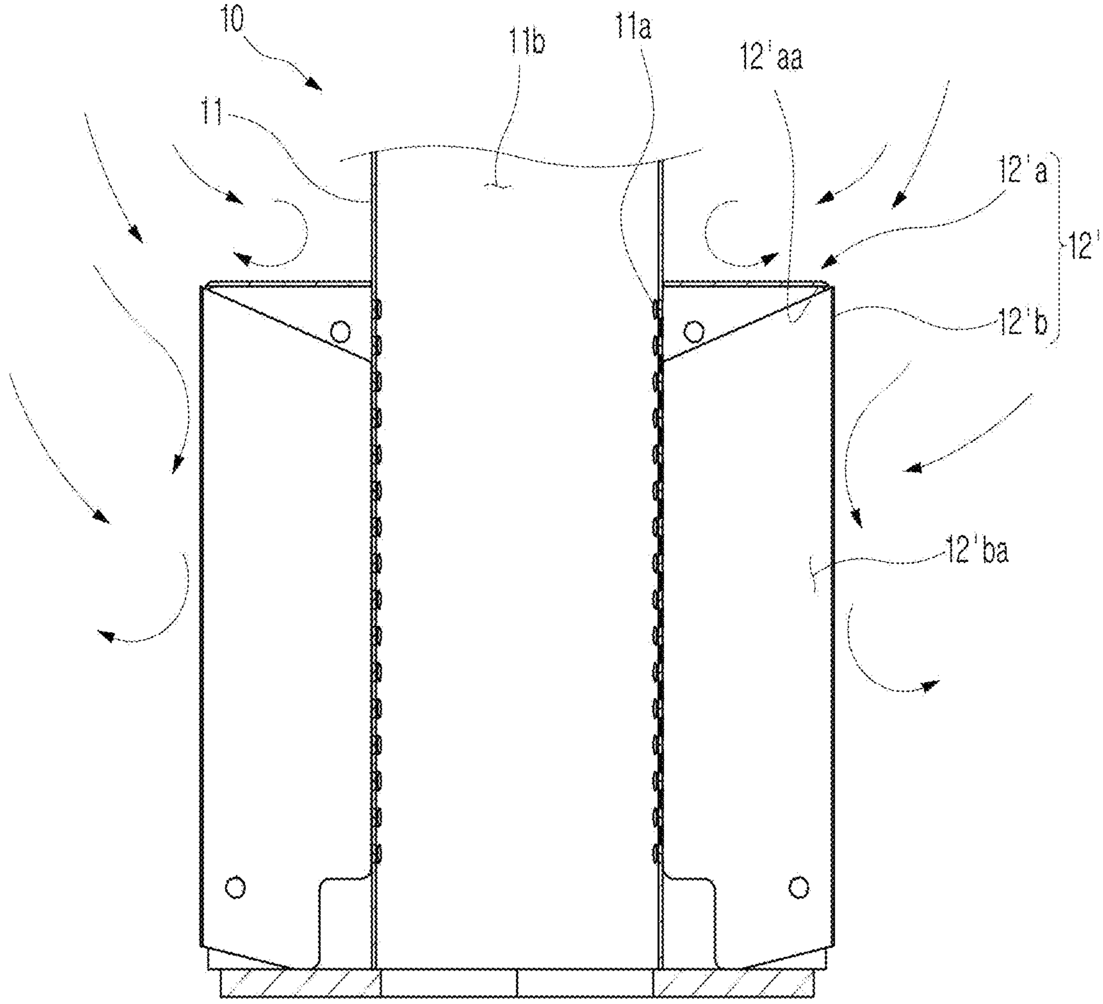
Figure 15C:
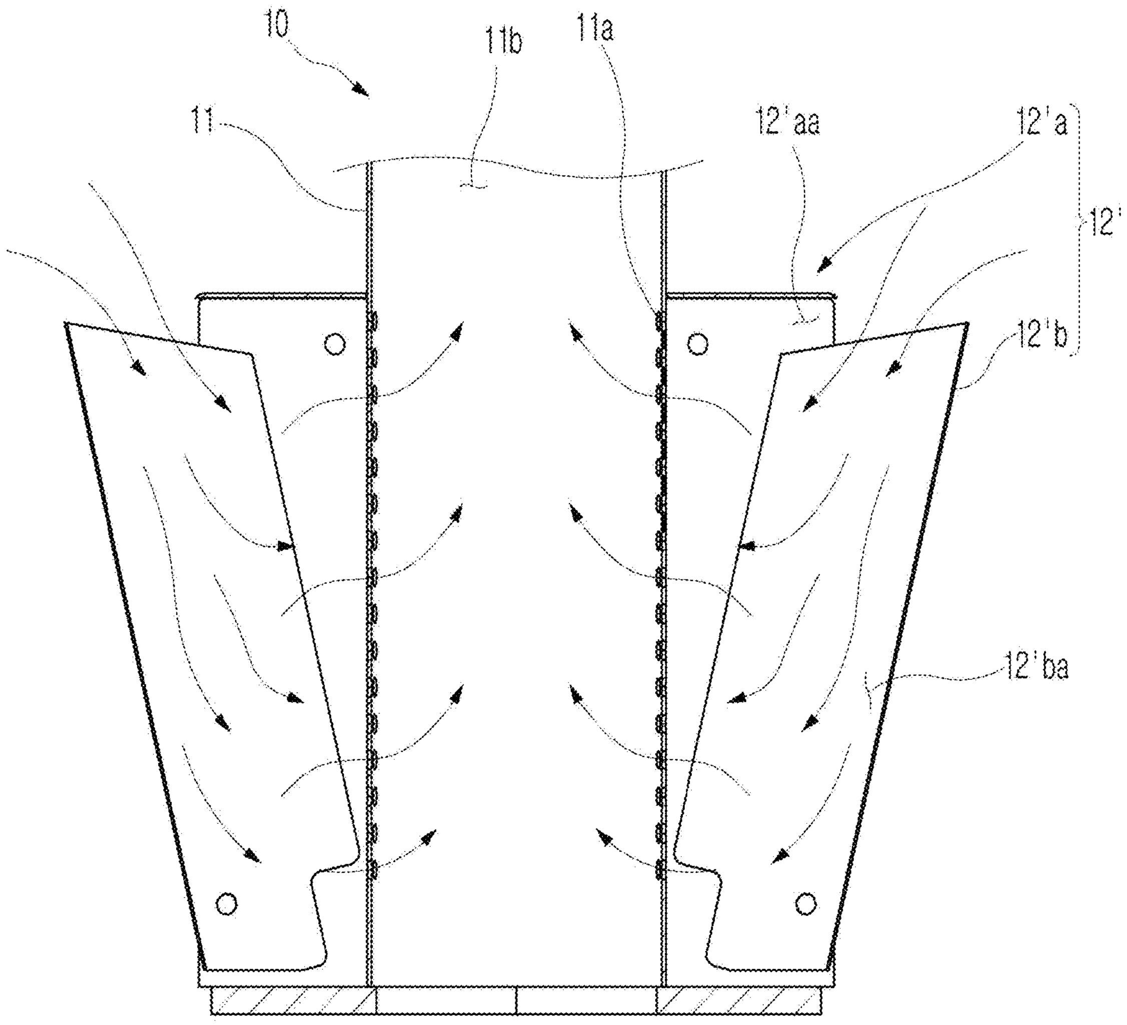

FIG. 12 is a perspective view of a cover installed at a lower portion of a pole according to another embodiment of the present invention; FIG. 13 is an exploded perspective view of a cover installed at a lower portion of a pole according to another embodiment of the present invention; FIG. 14A and FIG. 14B are drawings illustrating a state in which a second body portion of a cover installed at a lower portion of a pole rotates according to another embodiment of the present invention; and FIG. 15A through FIG. 15C are drawings illustrating a cover configured in different forms according to another embodiment of the present invention.

The basic configuration of the embodiments of FIG. 12 and FIG. 13 is the same as that of the embodiment of FIG. 2 through FIG. 11B, except that the present embodiment is configured to prevent damage to the lighting portion (30) that may occur due to low-temperature external air by adjusting the hydraulic amount of external air introduced into the interior of the pole (10) based on the external temperature, so that the external air having a temperature lower than a preset reference temperature does not flow into the pole (10).

As shown in FIG. 12 and FIG. 13, unlike the previous embodiment, the present embodiment includes a first body portion (12'*a*) installed at a position corresponding to the inflow port (11*a*) among the lower portion of the pole (10), and a second body portion (12'*b*) formed to surround the first body portion (12'*a*).

The first body portion (12'*a*) is formed in a substantially rectangular parallelepiped shape, and is formed with an opening (12'*aa*) at a lower portion thereof so that external air is introduced through the opening (12'*aa*) and can move into the interior of the pole (10) through the inflow port (11*a*).

The second body portion (12'*b*) is formed in a rectangular parallelepiped shape corresponding to the first body portion (12'*a*) so as to surround the first body portion (12'*a*), thereby shielding the opening (12'*aa*). The lower portion of the second body portion (12'*b*) is rotatably coupled to the first body portion (12'*a*) and rotates toward the outside of the pole (10). An air inlet (12'*ba*) through which the external air is introduced is formed at an upper portion of the second body portion (12'*b*).

The second body portion (12'*b*) serves to adjust the amount of the external air introduced into the opening (12'*aa*) by rotating its upper portion toward the outside of the pole (10) and thereby adjusting the spacing(S) between its inner surface and the outer surface of the first body portion (12'*a*).

For example, in the present embodiment, the amount of external air introduced through the opening (12'*aa*) is controlled according to the external temperature. When the external temperature is lower than a preset reference temperature, the second body portion (12'*b*) is positioned so as to surround the first body portion (12'*a*), as shown in FIG. 14A. In this state, the second body portion (12'*b*) shields the opening (12'*aa*) of the first body portion (12'*a*), thereby blocking the external air from entering the opening (12'*aa*) and preventing damage to the lighting portion (30) caused by external air of excessively low temperature.

When the external temperature is higher than the reference temperature, the upper portion of the second body portion (12'*b*) is rotated outward of the pole (10), as shown in FIG. 14B, thereby forming a spacing(S) between the outer surface of the first body portion (12'*a*) and the inner surface of the second body portion (12'*b*). By opening the opening (12'*aa*), the amount of external air introduced into the opening (12'*aa*) is increased, thereby effectively dissipating heat from the lighting portion (30) using the introduced external air.

Meanwhile, although the present embodiment describes the second body portion (12'*b*) as being formed to surround the first body portion (12'*a*), the present invention is not limited thereto. As illustrated in FIG. 15A to FIG. 15C, the opening (12'*aa*) may be entirely formed at the front of the first body portion (12'*a*), and the second body portion (12'*b*) may be rotatably installed inside the first body portion (12'*a*) toward the outside of the cover (12') through the opening (12'*aa*). In this case, it is preferable that the second body portion (12'*b*) be formed such that its upper portion is inclined downward toward the inside of the pole (10) so as not to interfere with the first body portion (12'*a*) during the rotational movement thereof.

Since the remaining structure thereof is the same as that of the basic embodiment described above, a further detailed description will be omitted.

Figure 16:
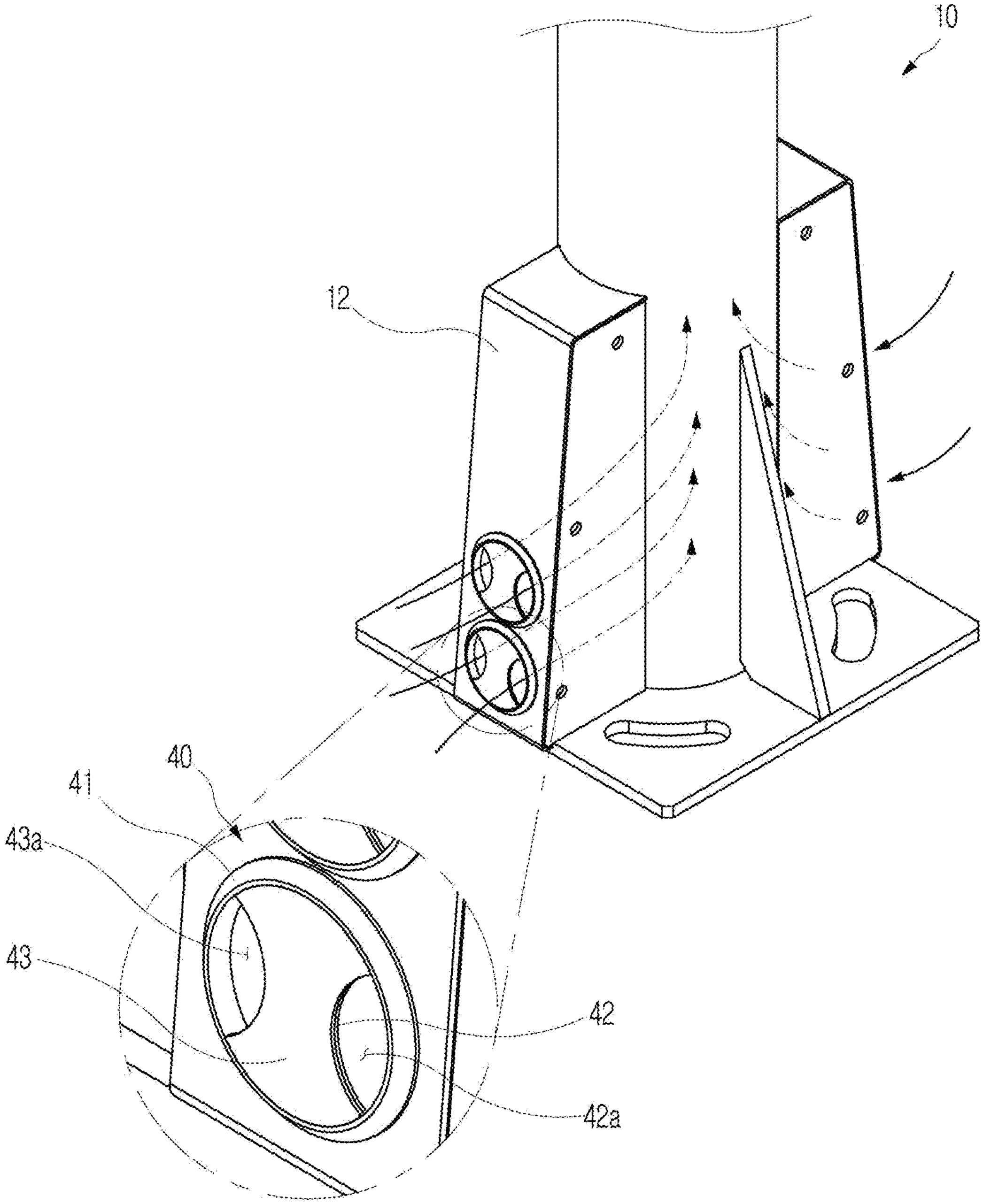
FIG. 16 is a perspective view illustrating a lower portion of a pole according to another embodiment of the present invention.
Figure 17:
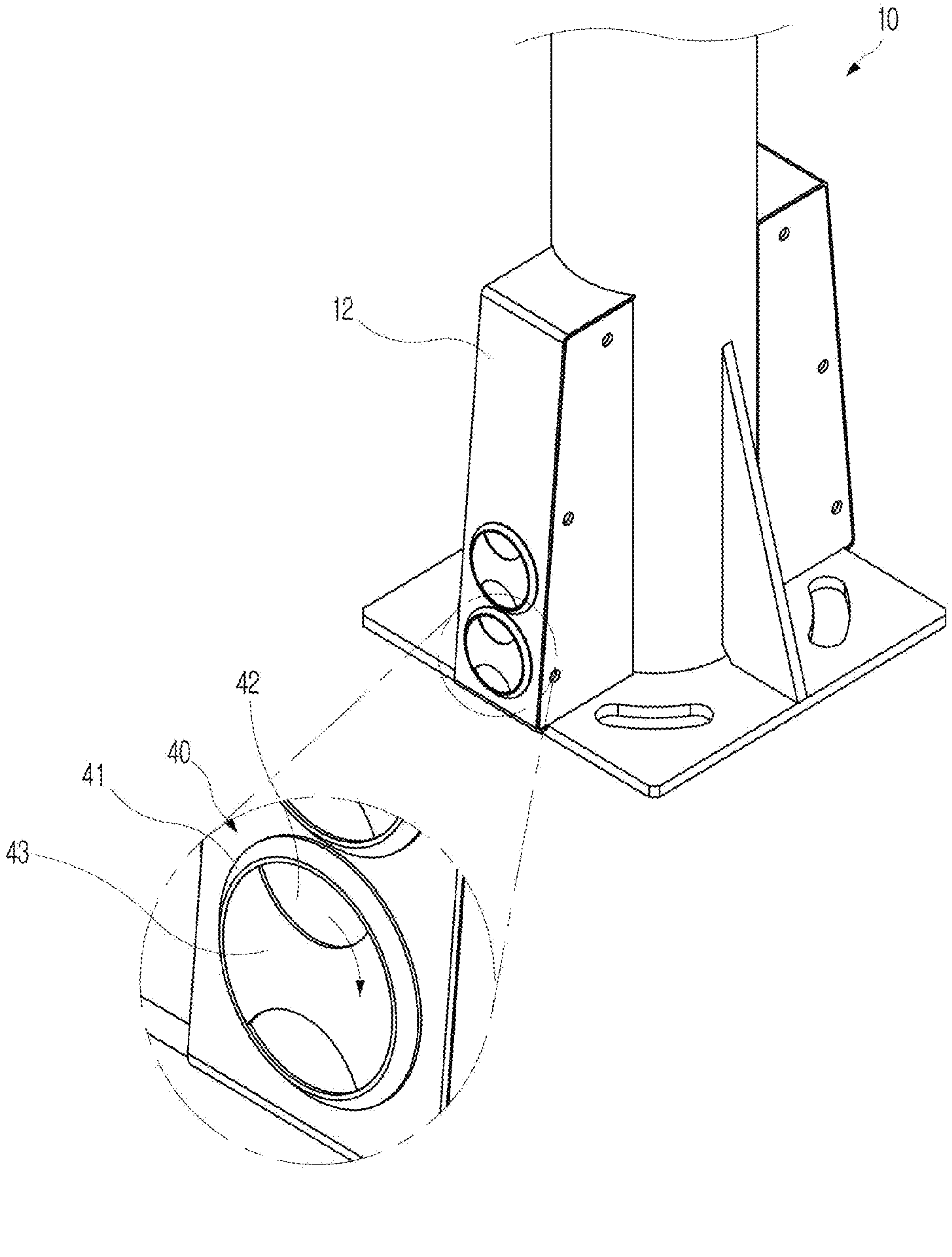
FIG. 17 is a drawing illustrating a state in which an opening/closing portion shields an air inlet according to another embodiment of the present invention.

FIG. 16 is a perspective view illustrating a lower portion of a pole according to another embodiment of the present invention; and FIG. 17 is a drawing illustrating a state in which an opening/closing portion shields an air inlet according to another embodiment of the present invention.

As shown in FIG. 16, the present embodiment is configured such that the amount of external air introduced according to the external temperature can be adjusted, as in the previous embodiment, while having a simpler structure.

In the present embodiment, an air inlet (12*a*) is formed on a side surface of the cover (12), and an opening/closing portion (40) for opening and closing the air inlet (12*a*) is further provided on one side of the cover (12) where the air inlet (12*a*) is formed.

The opening/closing portion (40) may include a hollow ring body (41) installed on an inner circumference of the cover (12) in which the air inlet (12*a*) is formed; a fixed panel (42) formed inside the ring body (41) to shield the hollow space of the ring body (41), the fixed panel (42) having first pass-through holes (42*a*) formed at both lateral portions thereof; and a rotating panel (43) that is rotatably formed inside the ring body (41) on a front side of the fixed panel (42) and has second pass-through holes (43*a*) formed on one side thereof.

In this embodiment, when the external temperature is higher than the preset reference temperature, the rotating panel (43) is positioned such that the first pass-through holes (42*a*) and the second pass-through hole (43*a*) are aligned with each other, as shown in FIG. 16. In this state, the external air is introduced into the interior of the cover (12) through the first and second passage holes (42*a* and 43*a*), and the external air is further introduced into the interior of the pole (10) through the inflow port (11*a*), thereby dissipating heat from the lighting portion (30) by means of the introduced external air. Additionally, by rotating the rotating panel (43) to adjust the size of the first pass-through hole (42*a*) that is exposed to the outside, the amount of the external air introduced can be controlled.

When the external temperature is lower than the preset reference temperature, the rotating panel (43) is rotated such that it shields the first pass-through hole (42*a*) exposed to the outside, thereby blocking the external air from being introduced into the interior of the cover (12) and preventing damage to the lighting portion (30) caused by cold external air.

Since the remaining structure is the same as that of the basic embodiment described above, further detailed description will be omitted.

According to the present invention as described above, the external air moving through the airflow passage is branched into the interior of the heat sink and into an upper space of the case, thereby inducing simultaneous removal or outward discharge of heat sources inside and outside the heat sink. As a result, the cooling efficiency of the heat sink is improved, and the heat dissipation efficiency of the lighting unit can be greatly enhanced.

In addition, the present invention provides another effect in that the pole and the support tube can be coupled with a simple structure while stably maintaining a firm coupling state.

Furthermore, the present invention is characterized in that the airflow of external air inside the heat sink and the upper space of the case can be made smooth through the first and second shielding portions that shield the fronts of the first air discharge port and the second air discharge port through which the external air passing through the inside of the heat sink and the upper space of the case, respectively, is discharged, thereby further improving the heat dissipation efficiency.

In addition, the present invention provides the effect of greatly enhancing the heat dissipation efficiency of the lighting unit, as well as preventing the lighting unit such as LEDs from being damaged by cold external air, by adjusting the inflow amount of external air introduced into the interior of the pole or blocking the inflow of the external air according to the outside air temperature.

While the present invention has been described with respect to the specific embodiments, it will be apparent to those skilled in the art that various changes and modifications may be made without departing from the spirit and scope of the invention as defined in the following claims.

What is claimed is:

1. A streetlight with improved thermal efficiency and extended lifespan, comprising:

a pole in which an inflow port, through which external air is introduced, is formed at a lower portion thereof, and a hollow portion, through which the introduced air moves upward, is formed inside the pole;

a support tube in which an air transfer passage is formed, one end of the support tube being coupled to an upper portion of the pole such that the air transfer passage communicates with the hollow portion, the support tube being formed to extend outward from the pole, and a plurality of through holes communicating with the air transfer passage being formed on one side thereof; and a lighting portion coupled to one side of the support tube and configured to emit light downward to illuminate a predetermined illumination area, wherein the lighting portion comprises:

a case in which a heat dissipation space is formed, one side of a rear end of the case being coupled to one side of the support tube such that at least one of the plurality of through holes communicates with the heat dissipation space, a first air discharge port being formed at one side of a front end of the case, and a second air discharge port being formed at one side of an upper portion of the case;

a lighting unit installed on one side of a lower surface of the case; and a heat sink in which a flow path for air flow is formed, the heat sink being installed above the lighting unit inside the case, one end of the heat sink being connected to the other side of the support tube such that at least one of the plurality of through holes communicates with the flow path, and the other end of the heat sink being connected to an inner surface of the front end of the case such that the first air discharge port communicates with the flow path.

2. The streetlight of claim 1, wherein the support tube includes a first through hole formed on one side of an upper surface thereof connected to the case, the first through hole communicating with the heat dissipation space, and a second through hole formed on one side of a lateral surface thereof, the second through hole communicating with the heat dissipation space in a direction different from the first through hole.

3. The streetlight of claim 1, wherein the pole includes a body portion having the inflow port, through which the external air is introduced, formed at a lower portion thereof and the hollow portion, through which the introduced air moves upward, formed therein; and an extension portion that extends upward from an upper end of the body portion, at least one side of the extension portion being bent to have a diameter smaller than that of the body portion, and a nut member being integrally formed on one side of the extension portion, the nut member having a nut hole being formed in a lateral surface thereof; and wherein the support tube includes a coupling portion inserted into the extension portion, the coupling portion having, at one side corresponding to the nut member, a coupling hole through which a fastening means passes to be screw-coupled to the nut member, whereby the coupling portion is fastened to the extension portion.

4. The streetlight of claim 1, wherein the lighting potion further comprises:

a first shielding portion extending from one side of a front end of the case and spaced apart from a front side of the first air discharge port by a predetermined distance so as to shield the front side of the first air discharge port, thereby allowing the air discharged through the first air discharge port to be discharged upward or downward; and a second shielding portion extending from an upper side of the case and spaced apart from a front side of the second air discharge port by a predetermined distance so as to shield the front side of the second air discharge port, thereby allowing the air discharged through the second air discharge port to be discharged upward or downward.

5. The streetlight of claim 1, wherein the pole comprises:

a body portion having the inflow port, through which the external air is introduced, formed at a lower portion thereof and the hollow portion, through which the introduced air moves upward, formed therein; and a cover installed on one side of the body portion where the inflow port is formed, the cover shielding the inflow port and having, at a lower portion thereof, a plurality of air inlets through which the external air is introduced;

wherein each of the air inlets are formed with a predetermined diameter so as to prevent foreign substances from entering from the outside.

6. The streetlight of claim 5, wherein the cover comprises:

a first body portion installed on one side of the body portion where the inflow port is formed, the first body portion having an opening formed at a lower side thereof; and a second body portion formed to surround the first body portion and configured to shield the opening, the second body portion having a lower end rotatably coupled to a lower portion of the first body portion, rotating toward an outward direction of the first body portion when an external temperature is equal to or lower than a predetermined reference temperature, and having, at an upper side thereof, an air inlet through which the external air is introduced.

7. The streetlight of claim 5, wherein the pole further comprises an opening/closing portion installed on one side of the body portion where the air inlet is formed, the opening/closing portion being configured to open or close the air inlet.

* * * * *